United States Patent
Choi et al.

(10) Patent No.: US 12,061,097 B2
(45) Date of Patent: Aug. 13, 2024

(54) SUBSTRATE TYPE SENSOR FOR MEASURING HORIZONTALITY OF SUBSTRATE SUPPORT MEMBER PROVIDED IN ATMOSPHERE ACCOMPANIED BY TEMPERATURE CHANGE, METHOD FOR MEASURING HORIZONTALITY OF SUBSTRATE SUPPORT MEMBER BY USING THE SAME, AND NON-TRANSITORY COMPUTER READABLE MEDIUM

(71) Applicant: SEMES CO., LTD., Chungcheongnam-do (KR)

(72) Inventors: Young Seop Choi, Chungcheongnam-do (KR); Yong-Jun Seo, Gyeonggi-do (KR); Sang Hyun Son, Busan (KR); Sang Min Lee, Seoul (KR); Jong Hyeon Woo, Chungcheongnam-do (KR); Hwan Bin Kim, Chungcheongnam-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 446 days.

(21) Appl. No.: 17/560,390

(22) Filed: Dec. 23, 2021

(65) Prior Publication Data
US 2022/0205782 A1    Jun. 30, 2022

(30) Foreign Application Priority Data

Dec. 31, 2020    (KR) ................... 10-2020-0189440

(51) Int. Cl.
*G01C 9/02*    (2006.01)
*G01C 19/00*    (2013.01)
(Continued)

(52) U.S. Cl.
CPC ............. *G01C 9/02* (2013.01); *G01C 19/00* (2013.01); *G01P 15/08* (2013.01); *G01P 15/18* (2013.01)

(58) Field of Classification Search
CPC ............. G01C 9/02; G01C 19/00; G01P 15/18
(Continued)

(56) References Cited

U.S. PATENT DOCUMENTS 6,244,121 B1    6/2001    Hunter
7,159,442 B1 *    1/2007    Jean .................... H01H 35/14
                                            73/514.16
(Continued)

FOREIGN PATENT DOCUMENTS

JP      2009-12107 A    1/2009
JP      2011-209001 A    10/2011
(Continued)

OTHER PUBLICATIONS

Taiwan Office Action issued in corresponding TW Patent Application No. 110148804, dated Jan. 4, 2023.
(Continued)

*Primary Examiner* — George B Bennett
(74) *Attorney, Agent, or Firm* — Carter, DeLuca & Farrell LLP

(57) ABSTRACT

A substrate type sensor provided in an atmosphere accompanied by a temperature change to measure a horizontality of a support member that supports a substrate is disclosed. The substrate type sensor may include a base having a shape of the substrate, one or more sensors provided in the base and including 3 or more axis acceleration sensors or 6 or more axis measurement units (IMUs), a receiver configured to receive data collected by the one or more sensors and a power source configured to provide electric power to the one or more sensors and the receiver.

6 Claims, 15 Drawing Sheets

(51) Int. Cl.
*G01P 15/08* (2006.01)
*G01P 15/18* (2013.01)

(58) Field of Classification Search
USPC .................. 33/366.11, 366.12, 366.13, 533
See application file for complete search history.

(56) References Cited

U.S. PATENT DOCUMENTS

| | | | |
|---|---|---|---|
| 9,972,724 | B2* | 5/2018 | Sugimoto ............... G01P 15/18 |
| 10,859,436 | B2* | 12/2020 | Allen .................... G01J 3/2823 |
| 11,579,165 | B2* | 2/2023 | Nguyen .................. G01P 15/18 |
| 11,756,815 | B2* | 9/2023 | Seo ................... H01L 21/67103 |
| | | | 73/503.3 |
| 2008/0102200 | A1 | 5/2008 | Doki et al. |
| 2015/0348772 | A1 | 12/2015 | Kolics |
| 2016/0254222 | A1 | 9/2016 | Kolics |
| 2018/0196548 | A1* | 7/2018 | Kim ....................... G06F 3/0443 |
| 2018/0289230 | A1 | 10/2018 | Imamura et al. |
| 2020/0075369 | A1 | 3/2020 | Potter et al. |

FOREIGN PATENT DOCUMENTS

| | | |
|---|---|---|
| JP | 2011-253844 A | 12/2011 |
| JP | 2016-146416 A | 8/2016 |
| KR | 20-0195128 U | 6/2000 |
| KR | 10-1155882 B1 | 6/2012 |
| KR | 10-1389784 B1 | 4/2014 |
| KR | 10-2018-0059641 A | 6/2018 |
| KR | 10-2018-0091714 A | 8/2018 |
| KR | 10-2058057 B1 | 12/2019 |
| KR | 10-2076290 B1 | 2/2020 |
| KR | 10-2020-0036631 A | 4/2020 |
| TW | 201013164 A | 4/2010 |
| TW | 201215847 A | 4/2012 |
| TW | 201215888 A | 4/2012 |
| TW | 201727707 A | 8/2017 |
| TW | 201800546 A | 1/2018 |
| TW | 201816844 A | 5/2018 |
| WO | 2016032241 A1 | 3/2016 |

OTHER PUBLICATIONS

Korean Office Action issued in corresponding KR Patent Application No. 20200189440, dated Jan. 26, 2023, with English translation.

Japanese Office Action issued in corresponding JP Patent Application No. 2021-211345, dated Feb. 7, 2023.

* cited by examiner (a)

(b)

(a)

(b)

SUBSTRATE TYPE SENSOR FOR MEASURING HORIZONTALITY OF SUBSTRATE SUPPORT MEMBER PROVIDED IN ATMOSPHERE ACCOMPANIED BY TEMPERATURE CHANGE, METHOD FOR MEASURING HORIZONTALITY OF SUBSTRATE SUPPORT MEMBER BY USING THE SAME, AND NON-TRANSITORY COMPUTER READABLE MEDIUM

CROSS-REFERENCE TO RELATED APPLICATIONS

A claim for priority under 35 U.S.C. § 119 is made to Korean Patent Application No. 10-2020-0189440 filed on Dec. 31, 2020, in the Korean Intellectual Property Office, the entire contents of which are hereby incorporated by reference.

BACKGROUND

Embodiments of the inventive concept described herein relate to a substrate type sensor for measuring a horizontality of a substrate support member provided in an atmosphere accompanied by a temperature change, and a method for measuring a horizontality by using the same.

In general, a semiconductor device is manufactured by using a substrate such a wafer. In detail, a semiconductor device is manufactured by performing a deposition process, a photographic process, an etching process, and the like to form a fine circuit pattern on an upper surface of a substrate.

Because an upper surface of the substrate, on which the circuit pattern is formed, may be contaminated while the processes are performed, a cleaning process may be performed to remove the foreign substances.

In recent years, a supercritical fluid has been used in a process of cleaning a substrate or a process of developing a substrate. According to an example, the cleaning process may be performed by cleaning the upper surface of the substrate through isopropyl alcohol (hereinafter, IPA), and removing the IPA left on the substrate by supplying carbon dioxide ($CO_2$) in a supercritical state to the upper surface of the substrate.

A process that uses the supercritical fluid uses a vessel that provides a treatment space, in which a process fluid may be maintained in a high-temperature/high pressure supercritical phase. The treatment space of the vessel, for example, has to be maintained at a threshold temperature or more and a threshold pressure or more of carbon dioxide when carbon dioxide ($CO_2$) is supplied to the upper surface of the substrate in the supercritical state. When the treatment space is maintained at the threshold temperature or more and the threshold pressure or more, a horizontal state of the wafer by the substrate support member that supports the wafer provided into the treatment space cannot be maintained, but currently, the inventors recognize that the horizontal state of the wafer cannot be directly measured by the substrate support member in the interior of the vessel.

SUMMARY

An aspect of the inventive concept provides a substrate type sensor for measuring a horizontality capable of measuring an idle state of a substrate support member located in an interior of a vessel that provides a high-temperature/high-pressure atmosphere and a horizontal state of the substrate support member during a process to treat a substrate (for example, a wafer) by using a supercritical fluid, and a method for measuring a horizontality by using the same.

An aspect of the inventive concept also provides a substrate type sensor for measuring a horizontality capable of measuring, in unit of 0.1 degrees or less, an idle state of a substrate support member located in an interior of a vessel that provides a high-temperature/high-pressure atmosphere and a horizontal state of the substrate support member during a process to treat a substrate (for example, a wafer) by using a supercritical fluid, and a method for measuring a horizontality by using the same.

An aspect of the inventive concept provides a substrate treating method and a substrate treating apparatus, by which a cleaning efficiency may be improved when a substrate is cleaned by using a supercritical fluid.

The aspect of the inventive concept is not limited thereto, and other unmentioned aspects of the present invention may be clearly appreciated by those skilled in the art from the following descriptions.

The inventive concept provides a substrate type sensor provided in an atmosphere accompanied by a temperature change to measure a horizontality of a support member that supports a substrate. In an embodiment, the substrate type sensor may include a base having a shape of the substrate, one or more sensors provided in the base and including 3 or more axis acceleration sensors or 6 or more axis measurement units (IMUs), a receiver that receives data collected by the one or more sensors, and a power source that provides electric power to the one or more sensors and the receiver.

In an embodiment, the base may have a physical size that is substantially the same as a size of the substrate.

In an embodiment, a plurality of sensors may be provided, and a second sensor may be provided at a location that is opposite to a first sensor by 180 degrees with respect to a center of the base.

In an embodiment, the substrate type sensor may further include a transmitter that transmits the data received by the receiver to an outside.

In an embodiment, the support member may include a plurality of support pins that space the substrate apart from a plane of the support member by a specific interval, and the one or more sensors may be located at locations corresponding to any one or more of the support pins.

In an embodiment, the one or more sensors may generate a unique error that is changed according to an exposed temperature.

The inventive concept also provides a method for measuring a horizontality by using the substrate type sensor. In an embodiment, the method may include (1) locating the substrate type sensor in the support member at a first angle, (2) receiving data collected by the one or more sensors in (1) as first data, (3) locating the substrate type sensor in the support member at a second angle that is different from the first angle, (4) receiving data collected by the one or more sensors in (3) as second data, and (5) determining whether the support member is horizontal by comparing the first data and the second data.

In an embodiment, the one or more sensors may be the 6 or more axis inertia measurement units (IMUs), the first data and the second data may include elements of rolls (Level X) and pitches (Level Y), respectively, the comparing of the first data and the second data may be comparing the elements of the first data and the elements of the second data, it may be determined that the support member is horizontal when the elements of the first data and the elements of the second data are included in the same category, and it may be determined that the support member is inclined when the elements of the first data and the elements of the second data are not included in the same category.

In an embodiment, the one or more sensors may be the 6 or more axis inertia measurement units (IMUs), the first data and the second data may include elements of rolls (Level X) and pitches (Level Y), respectively, the first data may include elements of (Level $X_1$, Level $Y_1$), the second data may include elements of (Level $X_2$, Level $Y_2$), the one or more sensors may generate a unique error that is changed according to an exposed temperature, an inclination of the support member, which is measured by the substrate type sensor, may be calculated as elements including (Level $X_a$, Level $Y_a$) by a non-transitory computer readable medium that stores a program code that is executable by a processor, and when the first angle is 0 degrees and the second angle is 180 degrees, Level $X_a$ may be (Level $X_1$−Level $X_2$)/2, and Level $Y_a$ may be (Level $Y_1$−Level $Y_2$)/2.

In an embodiment, the first data may include elements of (X1, Y1, Z1), the second data may include elements of (X2, Y2, Z2), the comparing of the first data and the second data may be comparing the elements of the first data and the elements of the second data, it may be determined that the support member is horizontal when the elements of the first data and the elements of the second data are included in the same category, and it may be determined that the support member is inclined when the elements of the first data and the elements of the second data are not included in the same category.

In an embodiment, the substrate type sensor may be configured such that a plurality of sensors are provided, and one sensor is provided at a location that is opposite to another sensor by 180 degrees with respect to a center of a base, the first data and the second data are received by the one sensor and the another sensor, respectively, it is determined whether the support member is horizontal by comparing the first data, which are received from the first sensor, and the second data, and verifying a validity of the determination derived from the one sensor by comparing the first data, which are received from the second sensor, and the second data.

In an embodiment, the support member may be provided to a high-pressure vessel of a substrate treating apparatus that treats a substrate by using a supercritical fluid, the support member may include a plurality of support pins that space the substrate apart from a plane of the support member by a specific interval, and the one or more sensors may be located at locations corresponding to one or more of the support pins at the first angle and the second angle.

In an embodiment, the support member may be fixed to an upper portion of the high-pressure vessel, a plurality of holders and a plurality of fixing rods may connect the holders and the upper portion of the high-pressure vessel, and the support pins may be formed on an upper surface of the holder.

In an embodiment, the first data may include elements of X1 and Y1 of (X1, Y1, Z1), the second data may include elements of X2 and Y2 of (X2, Y2, Z2), the sensor may generate a unique error that is changed according to an exposed temperature, and the unique error includes elements of X3 and Y3 of (X3, Y3, Z3), an inclination of the support member, which is measured by the substrate type sensor, may be calculated as an element including x and y of (x, y, z) by a non-transitory computer readable medium that stores a program code that is executable by a processor, when the first angle is 0 degrees and the second angle is 180 degrees, x is (X1−X2)/2, and y is (Y1−Y2)/2.

In an embodiment, the first data may include an element of (X1, Y1, Z1), the second data may include an element of (X2, Y2, Z2), the sensor may generate a unique error that is changed according to an exposed temperature, and the unique error may include elements of (X3, Y3, Z3), an inclination of the support member, which is measured by the substrate type sensor, may be calculated as an element including (x, y, z) by a non-transitory computer readable medium that stores a program code that is executable by a processor, and when the first angle is 0 degrees and the second angle is 180 degrees, x is (X1−X2)/2, and y is (Y1−Y2)/2, and z is $-\sqrt{g^2}-\sqrt{x^2+y^2}$).

The inventive concept also provides a non-transitory computer readable medium for storing a program code that is executable by a processor. In an embodiment, the processor may derive whether the support member is horizontal by comparing first data collected after the substrate type sensor is located in the support member at a first angle and second data collected after the substrate type sensor is located in the support member at a second angle that is different from the first angle.

In an embodiment, the first data and the second data may include elements of rolls (Level X) and pitches (Level Y), respectively, the comparing of the first data and the second data may be comparing the elements of the first data and the elements of the second data, it may be determined that the support member is horizontal when the elements of the first data and the elements of the second data are included in the same category, and it may be determined that the support member is inclined when the elements of the first data and the elements of the second data are not included in the same category.

In an embodiment, the first data and the second data may include elements of rolls (Level X) and pitches (Level Y), respectively, the first data may include an element of (Level X1, Level $Y_1$), the second data may include an element of (Level X2, Level $Y_2$), the one or more sensors may generate a unique error that is changed according to an exposed temperature, an inclination of the support member, which is measured by the substrate type sensor, may be calculated as an element including (Level $X_a$, Level $Y_a$) by a non-transitory computer readable medium that stores a program code that is executable by a processor, when the first angle is 0 degrees and the second angle is 180 degrees, Level $X_a$ is (Level $X_1$−Level $X_2$)/2, and wherein Level $Y_a$ is (Level $Y_1$−Level $Y_2$)/2.

In an embodiment, the first data may include X1 and Y1 elements of (X1, Y1 Z1), the second data may include X2 and Y2 elements of (X2, Y2, Z2), an inclination of the support member may be calculated as elements including x and y of (x, y, z), and when the first angle is defined as 0 degrees and the second angle is 180 degrees, x may be (X1−X2)/2 and y may be (Y1−Y2)/2.

In an embodiment, the first data may include an element of (X1, Y1, Z1), the second data may include an element of (X2, Y2, Z2), an inclination of the support member may be calculated as (x, y, z), and when the first angle is 0 degrees and the second angle is 180 degrees, x is (X1−X2)/2, and y is (Y1−Y2)/2, and z is $\sqrt{-x^2-\sqrt{x^2+y^2}}$.

In an embodiment, a unique error generated according a temperature, to which the sensor is exposed, include an element of (X3, Y3, Z3), x may be (X1−X2)/2, y may be (Y1−Y2)/2, and z may be calculated as $\sqrt{-x^2-\sqrt{x^2+y^2}}$.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
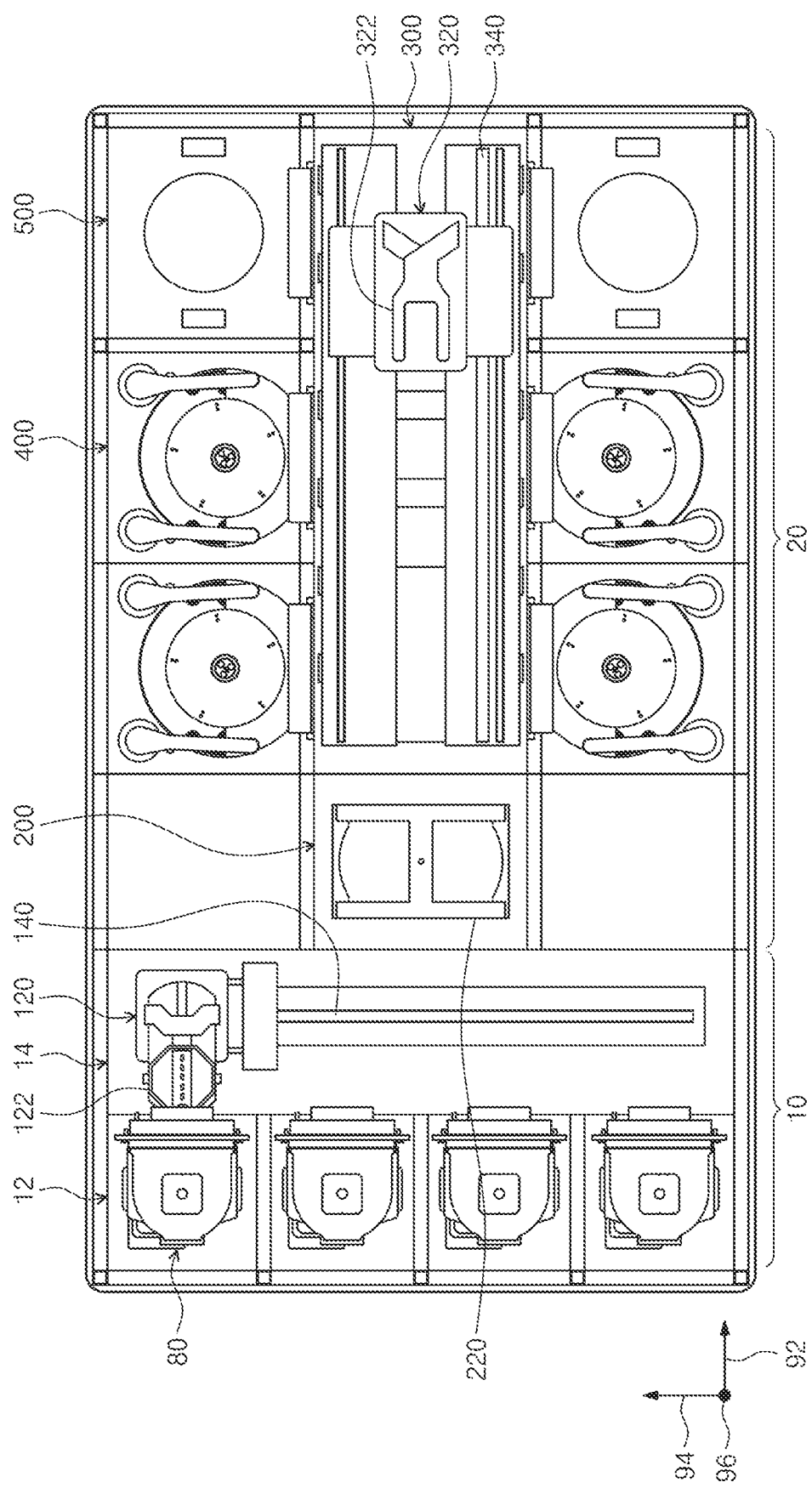
FIG. 1 is a plan view schematically illustrating a substrate treating apparatus according to an embodiment of the inventive concept.

Hereinafter, exemplary embodiments of the inventive concept will be described in detail with reference to the accompanying drawings so that those skilled in the art to which the inventive concept pertains may easily carry out the inventive concept. However, the inventive concept may be implemented in various different forms, and is not limited to the embodiments. Furthermore, in a description of the embodiments of the inventive concept, a detailed description of related known functions or configurations will be omitted when they make the essence of the inventive concept unnecessarily unclear. In addition, the same reference numerals are used for parts that perform similar functions and operations throughout the drawings.

The expression of 'including' some elements may mean that another element may be further included without being excluded unless there is a particularly contradictory description. In detail, the terms "including" and "having" are used to designate that the features, the numbers, the steps, the operations, the elements, the parts, or combination thereof described in the specification are present, and may be understood that one or more other features, numbers, step, operations, elements, parts, or combinations thereof may be added.

The terms of a singular form may include plural forms unless otherwise specified. Furthermore, in the drawings, the shapes and sizes of the elements may be exaggerated for clearer description.

The term "and/or" includes any one and one or more combinations of listed items. In addition, the meaning of "connected" in the specification means not only a case in which member A and member B are directly connected to each other and but also a case in which member A and member B are indirectly connected to each other while member C is interposed between member A and member B as well.

The embodiments of the inventive may be modified in various forms, and the scope of the inventive concept should not be construed to be limited to the following embodiments. The embodiments of the inventive concept are provided to describe the inventive concept for an ordinary person skilled in the art more completely. Accordingly, the shapes of the components of the drawings are exaggerated to emphasize clearer description thereof.

FIG. 1 is a plan view schematically illustrating a substrate treating system according to an embodiment of the inventive concept.

Referring to FIG. 1, a substrate treating system includes an index module 10, a treatment module 20, and a controller 30. According to an embodiment, the index module 10 and the treatment module 20 are disposed along one direction. Hereinafter, a direction, in which the index module 10 and the treatment module 20 are disposed, will be referred to as a first direction 92, a direction that is perpendicular to the first direction 92 when viewed from the top will be referred to as a second direction 94, and a direction that is perpendicular to both the first direction 92 and the second direction 94 will be referred to as a third direction 96.

The index module 10 transfers a wafer "W" from a container 80, in which the wafer "W" is received, to the treatment module 20, and the wafer "W" completely treated by the treatment module 20 is received in the container 80. A lengthwise direction of the index module 10 is the second direction 94. The index module 10 includes a plurality of load ports 12 and an index frame 14. The load ports 12 are located on an opposite side of the treatment module 20 with respect to the index frame 14. The container 80, in which the wafers "W" are received, are positioned on the load port 12.

The plurality of load ports 12 may be provided, and the plurality of load ports 12 may be disposed along the second direction 94.

The container 80 may be a closed container such as a front open unified pod (FOUP). The container 80 may be positioned on the load port 12 by a feeding unit (not illustrated) such as an overhead transfer, an overhead conveyor, or an automatic guided vehicle, or an operator.

An index robot 120 is provided in the index frame 14. A guide rail 140, a lengthwise direction of which is the second direction 94, may be provided in the index frame 14, and the index robot 120 may be movable on the guide rail 140. The index robot 120 includes a hand 122, on which the wafer "W" is positioned, and the hand 122 may be moved forwards and rearward, be rotated about the third direction 96, and be moved along the third direction 96. A plurality of hands 122 may be provided to be spaced apart from each other in an upward/downward direction, and the hands 122 may be moved forwards and rearward independently.

The treatment module 20 includes a buffer unit 200, a transfer apparatus 300, a liquid treating apparatus 400, and a supercritical treatment apparatus 500. The buffer unit 200 provides a space, in which the wafer "W" carried into the treatment module 20 and the wafer "W" carried out from the treatment module 20 temporarily stay. The liquid treating apparatus 400 performs a liquid treating process of liquid-treating the wafer "W" by supplying the liquid onto the wafer "W". The supercritical treatment apparatus 500 performs a drying process of removing the liquid that resides on the wafer "W". The transfer apparatus 300 transfers the wafer "W" between any two of the buffer unit 200, the liquid treating apparatus 400, and the supercritical treatment apparatus 500.

The transfer apparatus 300 is disposed such that the lengthwise direction thereof is the first direction 92. The buffer unit 200 is disposed between the index module 10 and the transfer apparatus 300. The liquid treating apparatus 400 and the supercritical treatment apparatus 500 may be disposed on a side of the transfer apparatus 300. The liquid treating apparatus 400 and the transfer apparatus 300 may be disposed along the second direction 94. The supercritical treatment apparatus 500 and the transfer apparatus 300 may be disposed along the second direction 94. The buffer unit 200 may be located at one end of the transfer apparatus 300.

According to an example, the liquid treating apparatuses 400 may be disposed on opposite sides of the transfer apparatus 300, the supercritical treatment apparatuses 500 may be disposed on opposite sides of the transfer apparatus 300, and the liquid treating apparatuses 400 may be disposed at locations that is closer to the buffer unit 200 than to the supercritical treatment apparatuses 500. On one side of the transfer apparatus 300, the liquid treating apparatuses 400 may be provided on an array of "A" by "B" ("A" and "B" are integers that are 1 or more than 1) along the first direction 92 and the third direction 96. Further, on one side of the transfer apparatus 300, the supercritical treatment apparatuses 500 may be provided on an array of "C" by "D" ("C" and "D" are integers that are 1 or more than 1) along the first direction 92 and the third direction 96. Unlike the above description, only the liquid treating apparatus 400 may be provided on one side of the transfer apparatus 300, and only the supercritical treatment apparatuses 500 may be provided on an opposite side thereof.

The transfer apparatus 300 has a transfer robot 320. A guide rail 340, a lengthwise direction of which is the first direction 92, may be provided in the transfer apparatus 300, and the transfer robot 320 may be movable on the guide rail 340. The transfer robot 320 includes a hand 322, on which the wafer "W" is positioned, and the hand 322 may be moved forwards and rearward, be rotated about the third direction 96, and be moved along the third direction 96. A plurality of hands 322 may be provided to be spaced apart from each other in an upward/downward direction, and the hands 322 may be moved forwards and rearward independently.

The buffer unit 200 includes a plurality of buffers 220, on which the wafers "W" are positioned. The buffers 220 are disposed to be spaced apart from each other along the third direction 96. A front face and a rear face of the buffer unit 200 may be opened. The front face is a surface that faces the index module 10, and the rear face is a surface that faces the transfer apparatus 300. The index robot 120 may approach the buffer unit 200 through the front face, and the transfer robot 320 may approach the buffer unit 200 through the rear face.

Figure 2:
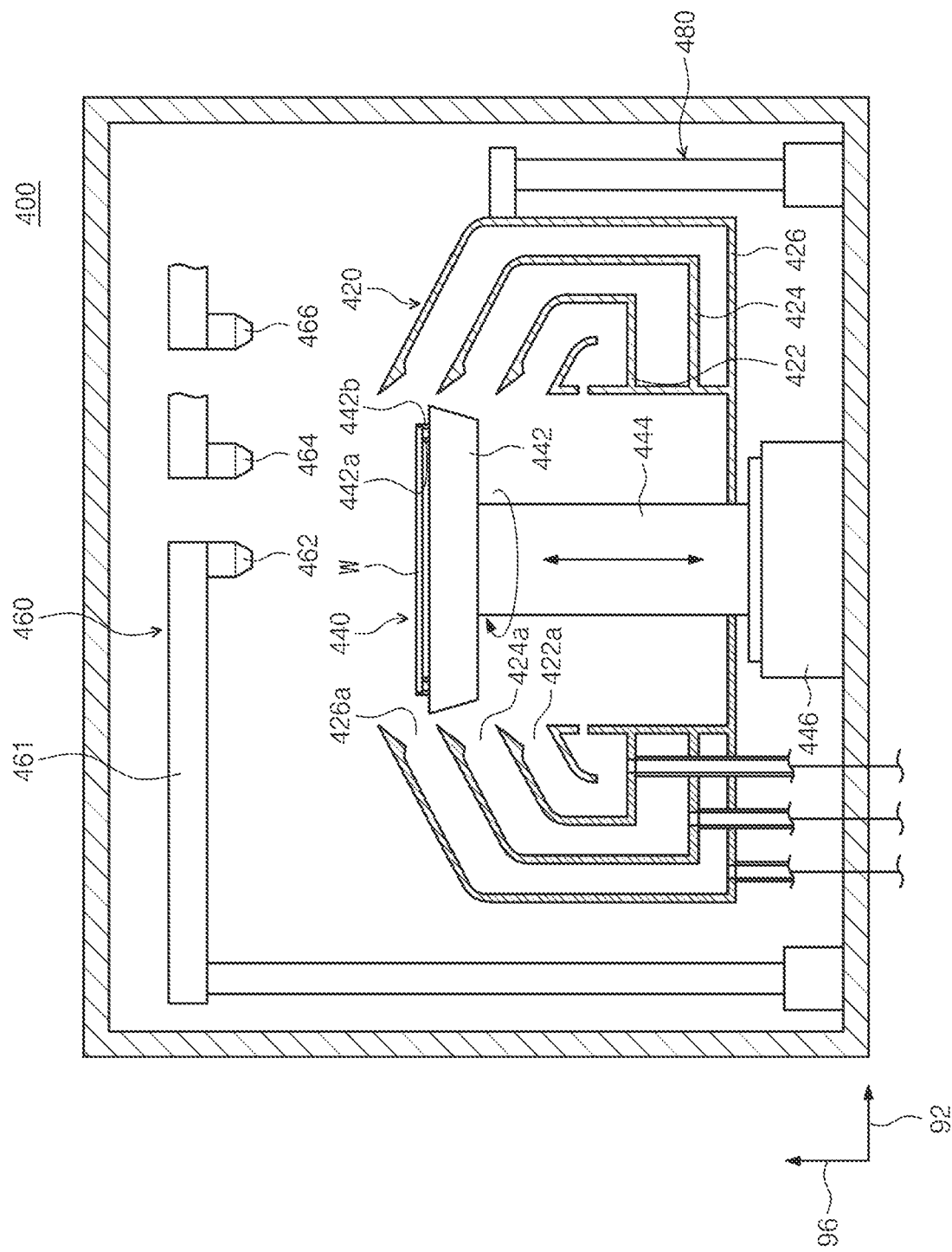
FIG. 2 is a view schematically illustrating an embodiment of a liquid treating apparatus of FIG. 1.

FIG. 2 is a view schematically illustrating an embodiment of the liquid treating apparatus 400 of FIG. 1. Referring to FIG. 2, the liquid treating apparatus 400 includes a housing 410, a cup 420, a support unit 440, a liquid supply unit 460, and an elevation unit 480. The housing 410 has a substantially rectangular parallelepiped shape. The cup 420, the support unit 440, and the liquid supply unit 460 are disposed in the housing 410.

The cup 420 has an open-topped treatment space, and the wafer "W" is liquid-treated in the treatment space. The support unit 440 supports the wafer "W" in the treatment space. The liquid supply unit 460 supplies a liquid onto the wafer "W" supported by the support unit 440. A plurality of kinds of liquids may be provided, and may be sequentially supplied onto the wafer "W". The elevation unit 480 adjusts a relative height between the cup 420 and the support unit 440.

According to an embodiment, the cup 420 has a plurality of recovery vessels 422, 424, and 426. The recovery vessels 422, 424, and 426 have recovery spaces for recovering the liquid used for the treatment of the substrate. The recovery vessels 422, 424, and 426 are provided to have ring shapes that surround the support unit 440. When the liquid treatment process is performed, the pre-treatment liquid that spatters due to the rotation of the wafer "W" is introduced into the recovery spaces through inlets 422a, 424a, and 426a of the recovery vessels 422, 424, and 426. According to an embodiment, the cup 420 has the first recovery vessel 422, the second recovery vessel 424, and the third recovery vessel 426. The first recovery vessel 422 is disposed to surround the support unit 440, the second recovery vessel 424 is disposed to surround the first recovery vessel 422, and the third recovery vessel 426 is disposed to surround the second recovery vessel 424. The second inlet 424a, through which the liquid is introduced into the second recovery vessel 424, may be located on the upper side of the first inlet 422a, through which the liquid is introduced into the first recovery vessel 422, and the third inlet 426a, through which the liquid is introduced into the third recovery vessel 426, may be located on the upper side of the second inlet 424a.

The support unit 440 has a support plate 442 and a driving shaft 444. An upper surface of the support plate 442 may have a substantially circular shape, and may have a diameter that is larger than that of the wafer "W". A support pin 442a that supports a rear surface of the wafer "W" is provided at a central portion of the support plate 442, and an upper end of the support pin 442a protrudes from the support plate 442 such that the wafer "W" is spaced apart from the support plate 442 by a specific distance. A chuck pin 442b is provided at an edge portion of the support plate 442. The chuck pin 442b protrudes upwards from the support plate 442, and supports a side of the wafer "W" such that the wafer "W" is not separated from the support unit 440 when the wafer "W" is rotated. The driving shaft 444 is driven by a driver 446 and is connected to a center of a bottom surface of the wafer "W", and rotates the support plate 442 about a central axis thereof.

According to an example, the liquid supply unit 460 has a first nozzle 462, a second nozzle 464, and a third nozzle 466. The first nozzle 462 supplies a first liquid onto the wafer "W". The first liquid may be a liquid that removes films or foreign substances that reside on the wafer "W". The second nozzle 464 supplies a second liquid onto the wafer "W". The second liquid may be a liquid that is easily dissolved in a third liquid. For example, the second liquid may be a liquid that is dissolved in the third liquid easier than the first liquid. The second liquid may be a liquid that neutralizes the first liquid supplied onto the wafer "W". Furthermore, the second liquid may be a liquid that neutralizes the first liquid and is dissolved in the third liquid easier than the first liquid. According to an embodiment, the second liquid may be water. The third nozzle 466 supplies a third liquid onto the wafer "W". The third liquid may be a liquid that is easily dissolved in a supercritical treatment fluid used in the supercritical treatment apparatus 500. For example, the third liquid may be a liquid that is dissolved in a supercritical fluid used in the supercritical treatment apparatus 500 easier than the second liquid. According to an example, the third liquid may be an organic solvent. The organic solvent may be isopropyl alcohol (IPA). According to an embodiment, the supercritical fluid may be carbon dioxide. The first nozzle 462, the second nozzle 464, and the third nozzle 466 may be supported by different arms 461, and the arms 461 may be moved independently. Optionally, the first nozzle 462, the second nozzle 464, and the third nozzle 466 may be mounted on the same arm to be moved at the same time.

The elevation unit 480 moves the cup 420 upwards and downwards. A relative height between the cup 420 and the wafer "W" is changed as the cup 420 is moved upwards and downwards. Accordingly, because the recovery vessels 422, 424, and 426 that recover the pre-treatment liquid are changed according to the kind of the liquid supplied to the wafer "W", the liquids may be separated and recovered. Unlike the above description, the cup 420 may be fixedly installed, and the elevation unit 480 may move the support unit 440 upwards and downwards.

Figure 3:
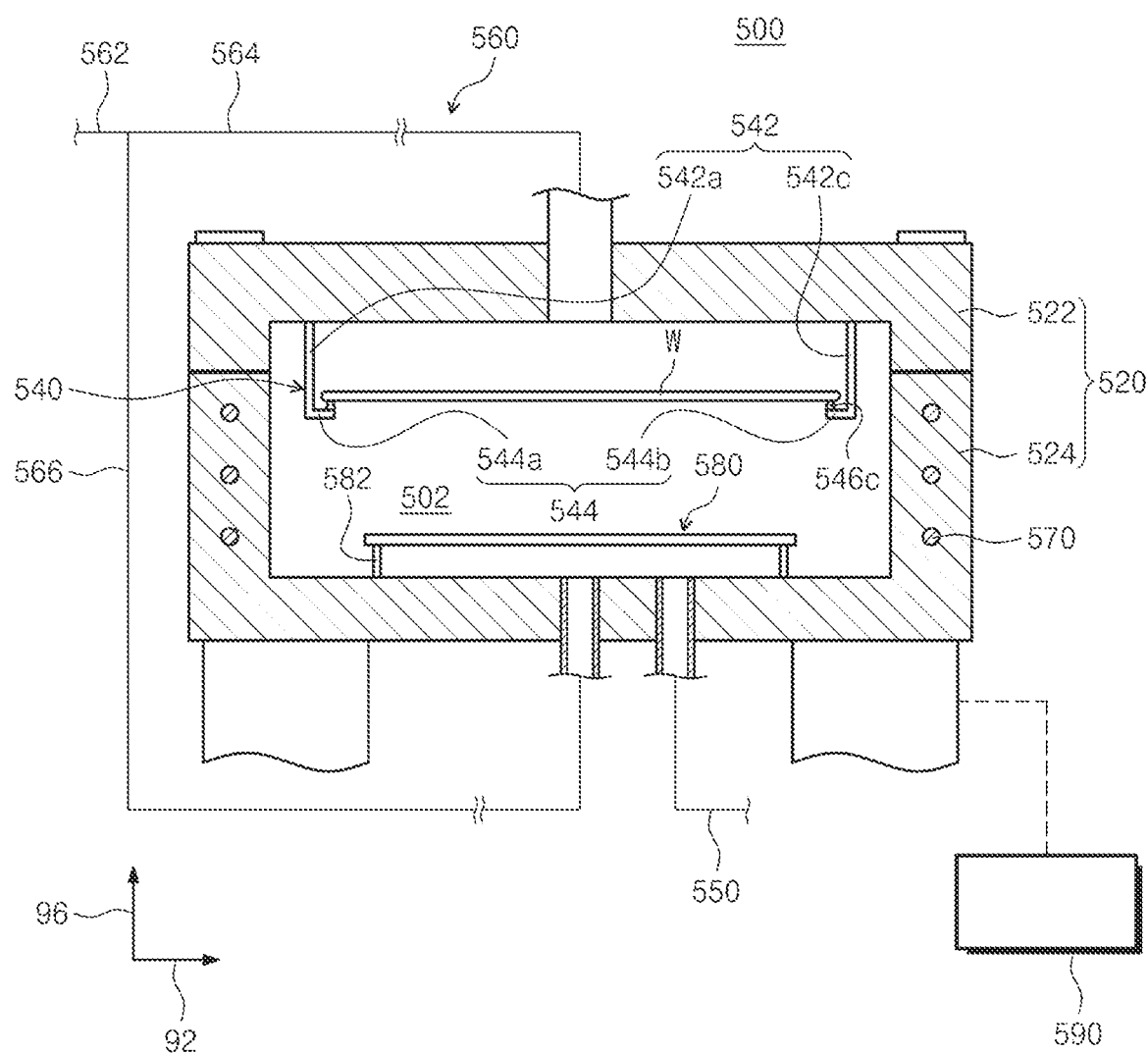
FIG. 3 is a view schematically illustrating an embodiment of a supercritical treatment apparatus of FIG. 1.

FIG. 3 is a view schematically illustrating an embodiment of the supercritical treatment apparatus 500 of FIG. 1. According to an embodiment, the supercritical treatment apparatus 500 removes the liquid on the wafer "W" by using the supercritical fluid. The supercritical treatment apparatus 500 include a vessel 520, a support member 540, a fluid supply unit 560, and a blocking plate 580.

The vessel 520 provides a treatment space 502, in which the supercritical process is performed. The vessel 520 has an upper vessel 522 (an upper body) and a lower vessel 524 (a lower body), and the upper vessel 522 and the lower vessel 524 are combined to provide the above-described treatment space 502. The upper vessel 522 is provided above the lower vessel 524. A location of the upper vessel 522 may be fixed, and the lower vessel 524 may be elevated by a driving member 590 such as a cylinder. When the lower vessel 524 is spaced apart from the upper vessel 522, the treatment space 502 is opened, and then, the wafer "W" is carried in or out. During a process, the lower vessel 524 is adhered to the upper vessel 522, and the treatment space 502 is sealed from the outside. The supercritical treatment apparatus 500 has a heater 570. According to an embodiment, the heater 570 is located inside a wall of the vessel 520. In an embodiment, the heater 570 may be provided to any one or more of the upper vessel 522 and the lower vessel 524 that constitute the vessel 520. The heater 570 heats the treatment space 502 of the vessel 520 such that the fluid supplied into the treatment space 502 of the vessel 520 is maintained in a supercritical state. The treatment space 502 forms an atmosphere due to the supercritical fluid.

The support member 540 supports the wafer "W" in the treatment space 502 of the vessel 520. The support member 540 includes a fixed rod 542 and a holder 544. The fixed rod 542 may be fixedly installed in the upper vessel 522 to protrude downwards from a bottom surface of the upper vessel 522. The fixed rod 542 may be provided such that a lengthwise direction thereof is in an upward/downward direction. A plurality of fixed rods 542 may be provided to be spaced apart from each other. The fixed rods 542 are disposed such that the wafer "W" does not interfere with the fixed rods 542 when the wafer "W" is carried into or out of a space surrounded by the fixed rods 542. The holder 544 is coupled to each of the fixed rods 542. The holder 544 extends from a lower end of the fixed rod 542 in a direction that is parallel to a ground surface. In an embodiment, the holder 544 extends in a shape that may support a circumference of a lower end of the wafer "W" to support the lower surface of the wafer "W" that is to be supported.

The fluid supply unit 560 supplies a process fluid to the treatment space 502 of the vessel 520. According to an embodiment, the process fluid may be supplied to the treatment space 502 in the supercritical state. Unlike this, the process fluid may be supplied to the treatment space 502 in a gaseous state, and may be phase-changed into the supercritical state in the treatment space 502. According to an embodiment, the fluid supply unit 560 has a main supply line 562, an upper branch line 564, and a lower branch line 566. The upper branch line 564 and the lower branch line 566 are branched from the main supply line 562. The upper branch line 564 is coupled to the upper vessel 522 to supply a cleaning fluid above the wafer "W" positioned on the support member 540. According to an example, the upper branch line 564 is coupled to a center of the upper vessel 522. The lower branch line 566 is coupled to the lower vessel 524 to supply the cleaning fluid below the wafer "W" positioned on the support member 540. According to an example, the lower branch line 566 is coupled to a center of the lower vessel 524. An exhaustion unit 550 is coupled to the lower vessel 524. The supercritical fluid in the treatment space 502 of the vessel 520 is discharged to the outside of the vessel 520 through the exhaustion unit 550.

The blocking plate 580 may be disposed in the treatment space 502 of the vessel 520. The blocking plate 580 may have a disk shape. The blocking plate 580 is supported by a support member 582 to be spaced upward apart from the bottom surface of the vessel 520. The support member 582 has a rod shape, and a plurality of support members 582 are disposed to be spaced apart from each other by a specific distance. When viewed from a top, the blocking plate 580 may be provided to overlap an outlet of the lower branch line 566 and an inlet of the exhaustion unit 550. The blocking plate 580 may prevent the cleaning fluid supplied through the lower branch line 566 from being directly discharged toward the wafer "W" so that the wafer "W" is damaged.

Figure 4:
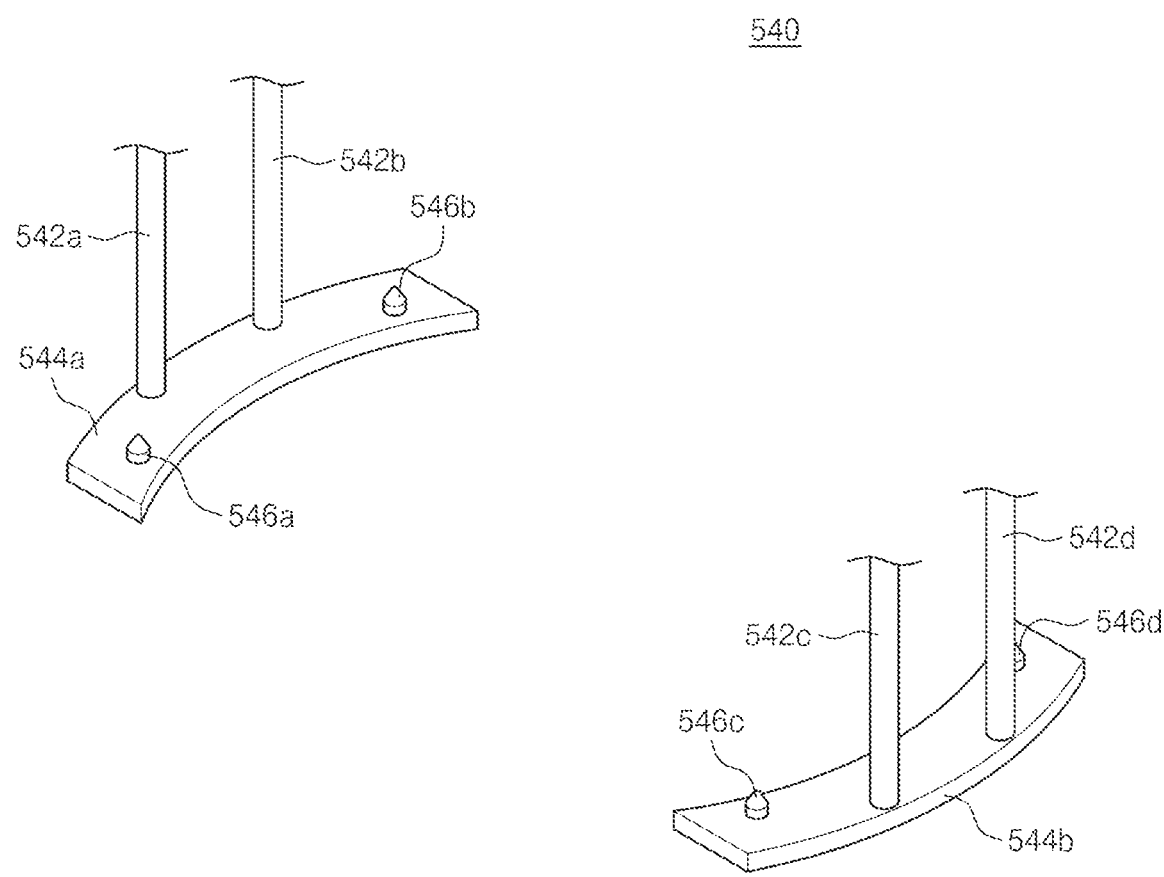
FIG. 4 is a perspective view illustrating an embodiment of a substrate support member provided in the supercritical treatment apparatus of FIG. 3.

FIG. 4 is a perspective view illustrating an embodiment of the support member 540 provided in the supercritical treatment apparatus of FIG. 3. Referring to FIG. 4, the support member 540 according to an embodiment will be described in more detail.

The support member 540 includes the fixed rod 542 and the holder 544. The fixed rod 542 may be fixedly installed in the upper vessel 522 to protrude downwards from a bottom surface of the upper vessel 522. The fixed rod 542 may be provided such that a lengthwise direction thereof is in an upward/downward direction. According to an embodiment, the plurality of fixed rods 542 may be provided to be spaced apart from each other. In an embodiment, the fixed rods 542 include a first fixed rod 542a, a second fixed rod 542b, a third fixed rod 542c, and a fourth fixed rod 542d. The plurality of holders 544 may be provided to be spaced apart from each other. In an embodiment, the holders 544 include a first holder 544a and a second holder 544b. The first fixed rod 542a and the second fixed rod 542b are coupled to the first holder 544a. The third fixed rod 542c and the fourth fixed rod 542d are coupled to the second holder 544b. The first fixed rod 542a and the second fixed rod 542b are located to be adjacent to each other, and the third fixed rod 542c and the fourth fixed rod 542d are located to be adjacent to each other. A distance between the first fixed rod 542a and the third fixed rod 542c are so large such that the wafer "W" may pass therebetween.

The first holder 544a may have an arc shape having a specific center angle. A first support pin 546a and a second support pin 546b are provided on an upper surface of the first holder 544a to be spaced apart from each other. The first support pin 546a and the second support pin 546b protrude from the upper surface of the first holder 544a by a specific height. As a spacing distance between the first support pin 546a and the second support pin 546b becomes larger, the wafer "W" may be stably supported, but the setting may be made differently according to designs.

The second holder 544b may have an arc shape having a specific center angle. A third support pin 546c and a fourth support pin 546d are provided on an upper surface of the second holder 544b to be spaced apart from each other. The third support pin 546c and the fourth support pin 546d protrude from the upper surface of the second holder 544b by a specific height. As a spacing distance between the third support pin 546c and the fourth support pin 546d becomes larger, the wafer "W" may be stably supported, but the setting may be made differently according to designs.

The first support pin 546a, the second support pin 546b, the third support pin 546c, and the fourth support pin 546d space the wafer "W" from a plane defined by the holders 544 by a specific interval. The support pins 546 alleviates contamination of the wafer "W" due to contact of the wafer "W" and the holder 544 by reducing a contact area of the wafer "W" and the holder 544. According to an embodiment, although the support pins 546 are a total of four support pins of the first support pin 546a, the second support pin 546b, the third support pin 546c, and the fourth support pin 546d, a different number of support pins 546 from the present description may be provided as long as the support pins 546 may be spaced apart from the plane defined by the holders 544 by the specific distance. The support pins 546 have to be maintained without deformation in a high-temperature and high-pressure environment. In an embodiment, the support pins 546 may be formed of the same material as that of the holders 544.

Due to the above-described structure, a peripheral area of the wafer "W" carried into the treatment space 502 of the vessel 520 is positioned on the support pins 546 of the holders 544, and an entire upper surface area of the wafer "W", a central area of the bottom surface of the wafer "W", and a portion of a peripheral area of the bottom surface of the wafer "W" are exposed to the process fluid supplied into the treatment space 502.

The heights of ends of the support pins 546 that support the wafer "W" have to be uniform. The heights of the support pins 546 may be changed according to horizontality of the holders 544 and a coupling degree of the fixed rods 542 and the upper vessel 522. Furthermore, heights of uppermost ends of the support pins 546 may become different due to an elevation of the lower vessel 524 in a process of opening the vessel 520. Due to various reasons other than the above-described reasons, heights of the uppermost ends of the support pins 546 may become different. However, the wafer "W" supported by the upper end of the support pins 546 may be maintained horizontally only when the heights of the uppermost ends of the support pins 546 are set to be the same. It may be determined through a water drop gauge whether the heights of the uppermost ends of the support pins 546 are the same, but an error range is severe and it is impossible to identify whether the heights of the uppermost ends of the support pins 546 are the same during the process.

Figure 5:
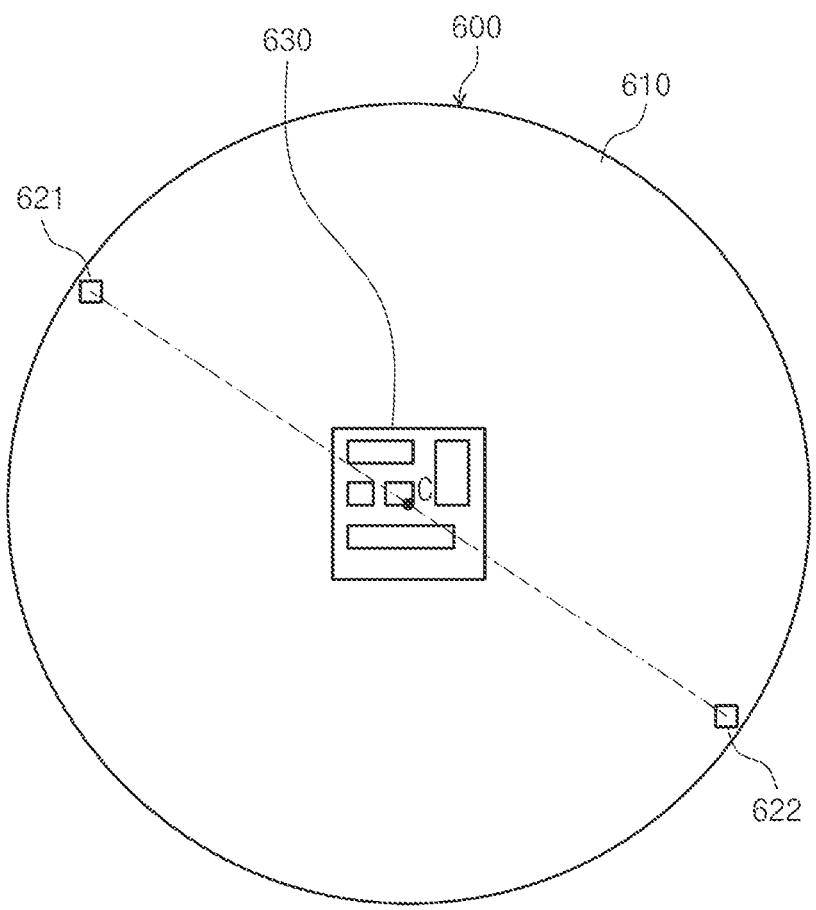
FIG. 5 is a plan view of a substrate type sensor according to an embodiment of the inventive concept.
Figure 6:
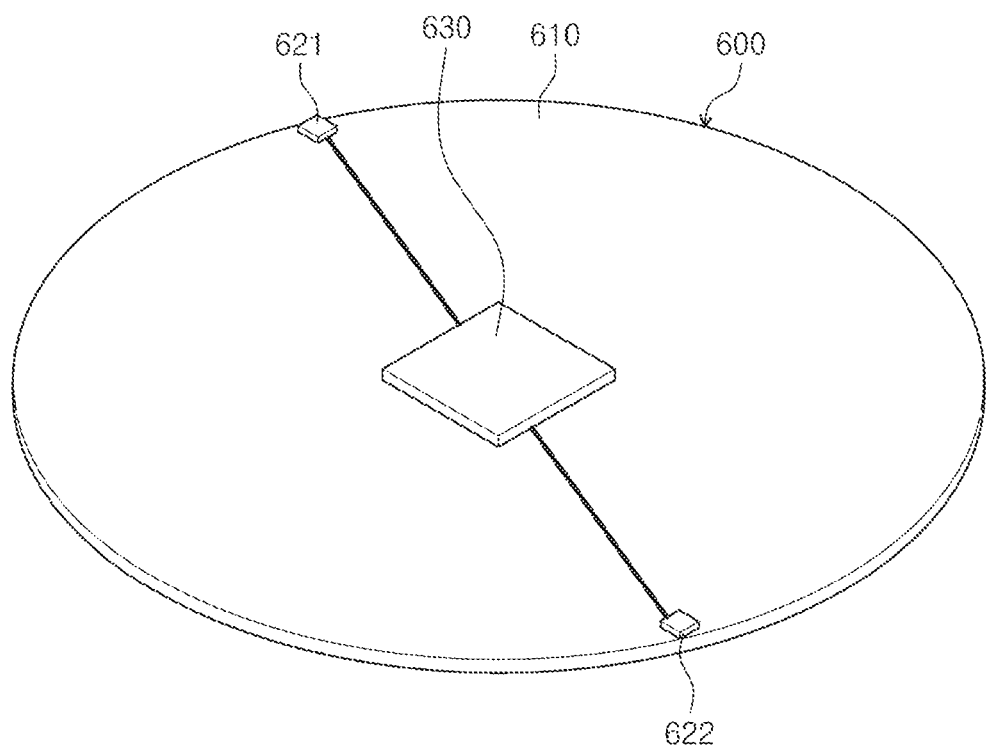
FIG. 6 is a perspective view of the substrate type sensor of FIG. 5 according to an embodiment of the inventive concept.

FIG. 5 is a plan view of a substrate type sensor 600 according to an embodiment of the inventive concept. FIG. 6 is a perspective view of the substrate type sensor of FIG. 5 according to an embodiment of the inventive concept. Referring to FIGS. 5 and 6, the substrate type sensor 600 according to an embodiment will be described. When the substrate type sensor 600 according to the embodiment of the inventive concept is used, it may be determined whether the wafer "W" may be supported horizontally by the support member 540. For example, the substrate type sensor 600 may measure differences of the heights of the uppermost ends of the support pins 546 in unit of not more than 0.1 degrees, and may identify whether the heights of the uppermost ends of the support pins 546 are the same during the process.

The substrate type sensor 600 includes a base 610. The base 610 is provided to have physical sizes that are substantially the same as or similar to those of the substrate. Being substantially the same or similar means a degree that is so large so that a condition formed by the substrate type sensor 600 may be considered by an ordinary person in the art as being a condition when the substrate is treated when the substrate type sensor 600 is in the same environment as that of the substrate even though the sizes of the substrate type sensor 600 are not exactly the same as those of the treated substrate.

The substrate type sensor 600 includes one or more sensors. The sensors include 3-axis or more acceleration sensors or 6 or more inertial measurement units. The acceleration sensor is a known technology, and is a sensor that measures a force applied to an object with reference to the gravitational acceleration of the earth. The acceleration sensor displays sizes of the axes by decomposing the gravitational acceleration into components of X, Y, and Z axes. The acceleration sensor may represent the gravitational acceleration by a vector sum of X, Y, and Z values. Because the value of the acceleration sensor has a specific value even in a stop state, an inclination degree may be recognized. In measuring an inclination by using the acceleration sensor, an inclination for the x axis may be expressed by $\arctan(x/z)$ and an inclination for the y axis may be expressed by $\arctan(y/z)$.

The 6 or more axis IMU (hereinafter, referred to as an 'IMU') is a known technology, and includes a 3 axis gyro sensor in addition to the 3-axis acceleration sensor. The 3 axis gyro sensor measures an angular velocity. The 6 or more axis IMU, as referenced from FIG. 14, calculates a roll (hereinafter, Level X), a pitch (hereinafter, Level Y), and a yaw. In the known IMU, a 3 axis geomagnetic sensor may be applied to correct a phenomenon, in which a final value of the gyro sensor is drifted.

Figure 7:
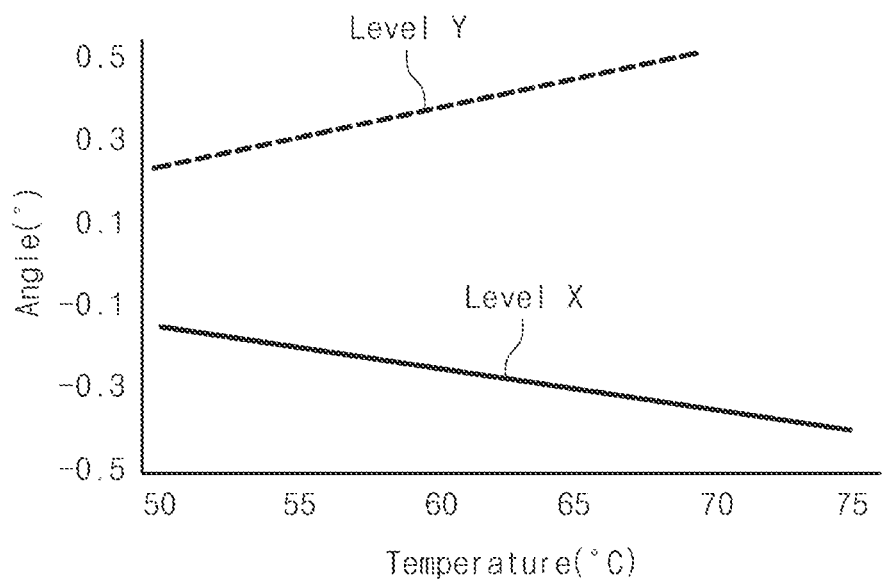
FIG. 7 illustrates an exemplary view, in which a measurement value of an IMU is changed according to a measurement value, in which a graph of FIG. 7A is an example of a change in a measurement value according to a change in a temperature of a first IMU and a graph of FIG. 7B is an example of a change in a measurement value according to a change in a temperature of a second IMU.
Figure 7:
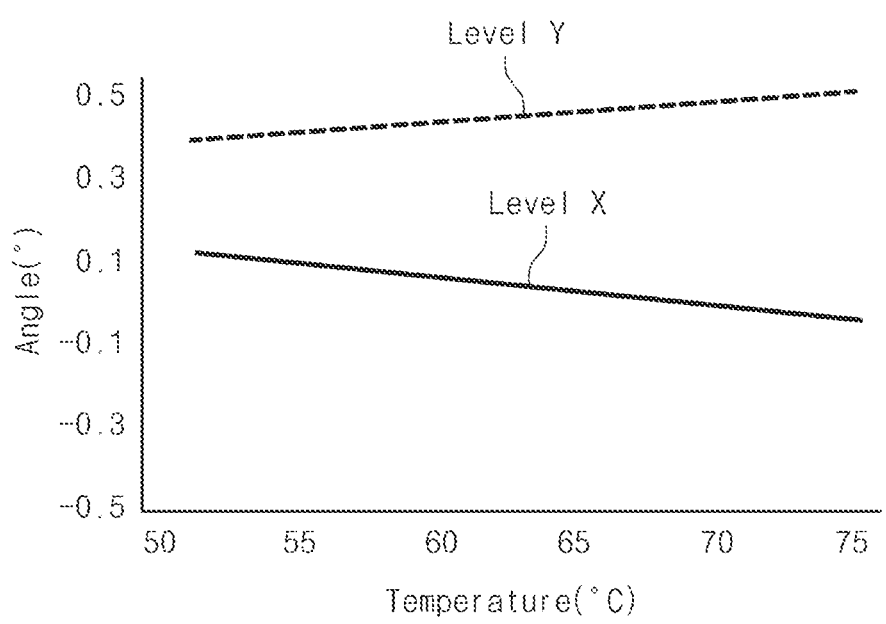

A measurement value of the sensor such as the IMU is changed while sensitively reacting with a change in temperature, and thus an error is caused. As an example, the measurement value of the IMU also increases as the temperature increases. As an example, the measurement value of the IMU also decreases as the temperature decreases. FIG. 7 illustrates an exemplary view, in which a measurement value of an IMU is changed according to a temperature, in which a graph of FIG. 7A is an example of a change in a measurement value according to a change in a temperature of a first IMU and a graph of FIG. 7B is an example of a change in a measurement value according to a change in a temperature of a second IMU. Referring to a graph of FIG. 7A and a graph of FIG. 7B, a change rate of a measurement of a first IMU for temperature is high as compared with that of a second IMU. According to an embodiment of the inventive concept, in spite of a measurement error according to arise in temperature, it may be determined whether the wafer "W" may be supported horizontally by the support member 540.

The sensor provided to the substrate type sensor 600 includes a first sensor 621. Moreover, a second sensor 622 may be further included. The first sensor 621 and the second sensor 622 are 6 or more axis IMUs. The first sensor 621 and the second sensor 622 may be located at locations that are opposite to each other with respect to a center "C" of the substrate type sensor 600. The first sensor 621 and the second sensor 622 may be located at edges of the substrate type sensor 600. In an embodiment, the first sensor 621 and the second sensor 622 may be disposed to be located at upper portions of the support pins 546. In more detail, the first sensor 621 may be located at an upper portion of the first support pin 546a, and the second sensor 622 may be located at an upper portion of the fourth support pin 546d. An angle defined by the first sensor 621 and the second sensor 622 with respect to the center "C" of the substrate type sensor 600 may be 180 degrees.

The substrate type sensor 600 includes a central module 630. The central module 630 may include a communication device that receives data from the first sensor 621 and/or the second sensor 622, a storage device that stores data, a transmitter that transmits data, and a power source that provides electric power to the configurations. The first sensor 621 and the central module 630 may be connected to each other such that the data acquired by the first sensor 621 may be received by the central module 630. The second sensor 622 and the central module 630 may be connected to each other such that the data acquired by the second sensor 622 may be received by the central module 630. The transmitter may be provided by a wireless communication module. Through the data transmitted by the transmitter, calculations that will be described below may be made by a device provided to an outside. Furthermore, a calculator is provided to the central module 630 and the calculations that will be described below are made by the calculator and an inclination generated by the support member 540 may be transmitted to an external device through the transmitter.

Figure 8:
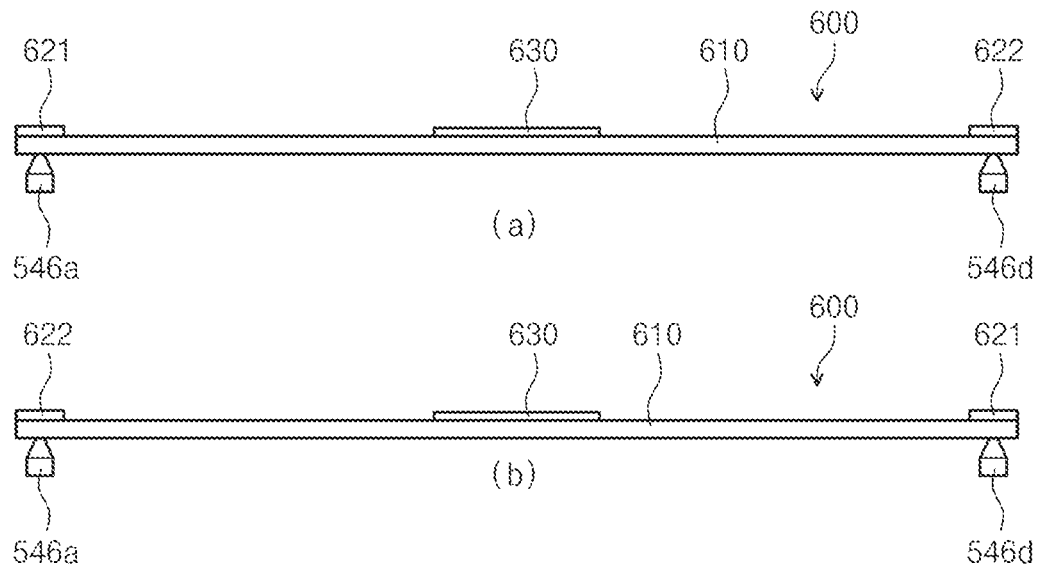
FIG. 8 illustrates a method for determining whether a support member may support a wafer horizontally by using a substrate type sensor 600 according to an embodiment of the inventive concept, and illustrates a case, in which the support member may support the wafer horizontally.
Figure 9:
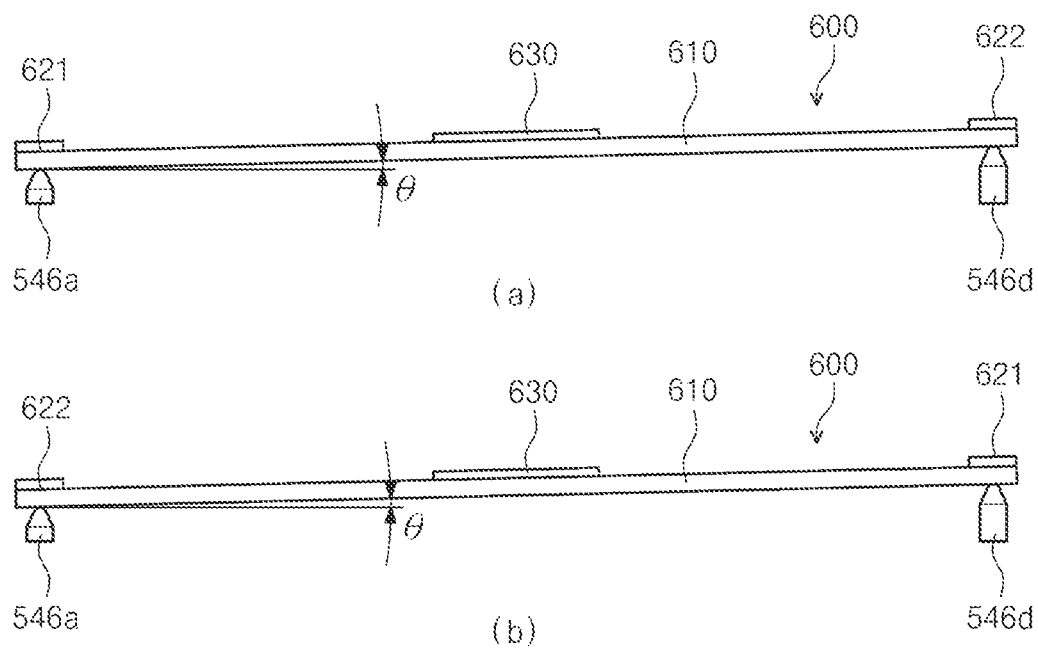
FIG. 9 illustrates a method for determining whether a support member may support a wafer horizontally by using a substrate type sensor 600 according to an embodiment of the inventive concept, and illustrates an example, in which the support member cannot support the wafer horizontally, and illustrates a case, in which the support member is inclined by θ when the wafer is supported by the support member.

FIG. 8 illustrates a method for determining whether the support member 540 may support a wafer horizontally by using the substrate type sensor 600 according to an embodiment of the inventive concept, and illustrates a case, in which the support member may support the wafer horizontally. FIG. 9 illustrates a method for determining whether a support member may support a wafer horizontally by using the substrate type sensor 600 according to an embodiment of the inventive concept, and illustrates an example, in which the support member cannot support the wafer horizontally, and illustrates a case, in which the support member is inclined by θ when the wafer is supported by the support member. Referring to FIGS. 8 and 9, a method for measuring a horizontality of a support member by using the substrate type sensor 600 will be described.

According to an embodiment, the substrate type sensor 600 includes a first operation of measuring an inclination of the support member 540 in a state, in which the substrate type sensor 600 is provided at a first angle, and a second operation of measuring an inclination of the support member 540 in a state, in which the substrate type sensor 600 is provided at a second angle. The second angle is a state, in which the substrate type sensor 600 is rotated from the first angle by 180 degrees. FIG. 8A and FIG. 9A illustrate an inclination measurement state according to the first operation, and FIG. 8B and FIG. 9B illustrate an inclination measurement state according to the second operation. The substrate type sensor 600 may be rotated from the first angle to the second angle through an aligner provided to an outside of the supercritical treatment apparatus 500. For example, the substrate type sensor 600 including the aligner that aligns the substrate in the buffer unit 200 may be rotated.

The rotated substrate type sensor 600 may be fed by the transfer robot 320 and may be located in the support member 540.

In a state, in which the substrate type sensor 600 is provided at the first angle according to the first operation, the first sensor 621 may be located above the first support pin 546a and the second sensor 622 may be located above the fourth support pin 546d. In a state, in which the substrate type sensor 600 is provided at the second angle according to the second operation, the first sensor 621 may be located above the fourth support pin 546d and the second sensor 622 may be located above the first support pin 546a. Locations of the first sensor 621 and the second sensor 622 are simple examples, and the inventive concept is not limited to the above-described locations. Meanwhile, the inventor(s) recognizes that a horizontal state of the support member 540 may be derived most accurately when the sensors are located above the support pins 546. However, because the plurality of support pins 546 may be provided at locations that are different from those of the embodiment of the inventive concept according to designs, the location of the sensor according to the first angle may be properly modified in consideration of general technical common senses.

The measurement values of the first sensor 621 and the second sensor 622 may be changed according to temperature. As described above, this is an essential feature of the IMU. According to an embodiment of the inventive concept, a horizontal state may be determined in spite of a change in a measurement value according to temperature, by measuring the inclination in a state, in which the substrate type sensor 600 is provided at the first angle and measuring the inclination in a state, in which the substrate type sensor 600 is provided at the second angle.

As an example, an atmosphere of a first temperature (a temperature that is higher than a room temperature, for example, a temperature around 70° C.) is assumed. It is assumed that the first sensor 621 generates a unique error of (0.64°, 0.42°) in a coordinate of (Level X, Level Y) in a temperature atmosphere of around 70° C. Furthermore, it is assumed that the second sensor 622 generates a unique error of (0.61°, 0.43°) in a coordinate of (Level X, Level Y) in a temperature atmosphere of around 70° C.

When the support member may horizontally support the wafer as illustrated in FIG. 8 when a value of the zero-calibrated IMU is (0.00°, 0.00°) in a horizontal state, a measurement value V1 of the first sensor 621 measured in a state, in which the substrate type sensor 600 is provided at the first angle according to the first operation is (0.64°, 0.42°), and a measurement value V1 of the second sensor 622 is (0.61°, 0.43°). Furthermore, a measurement value V2 of the first sensor 621 measured in a state, in which the substrate type sensor 600 is provided at the second angle according to the second operation is (0.64°, 0.42°), and a measurement value V2 of the second sensor 622 is (0.61°, 0.43°). Values that are measured substantially when the wafer is provided to be supported horizontally are only unique errors of the sensors, and thus a horizontal state is determined when V1−V2 is (0.00°, 0.00°). However, a mathematical value of (0.00°, 0.00°) in the embodiment of the inventive concept is expressed, but the horizontal state is determined in a state that may be substantially considered as (0.00°, 0.00°). For example, when a range of (±0.05°, ±0.05°) is evaluated as being horizontal, the horizontal state is determined even though the value is not (0.00°, 0.00°) mathematically.

A comparison result is as in Table 1.

TABLE 1

Measurement values in State of FIG. 8 in First Temperature Atmosphere

|  | Unique error in atmosphere of first temperature | Measurement value V1 at first angle | Measurement value V2 at second angle | V1 − V2 | Determinaton |
|---|---|---|---|---|---|
| First sensor 621 | (0.64°, 0.42°) | (0.64°, 0.42°) | (0.64°, 0.42°) | (0.00°, 0.00°) | Horizontal |
| Second sensor 622 | (0.61°, 0.43°) | (0.61°, 0.43°) | (0.61°, 0.43°) | (0.00°, 0.00°) | Horizontal |

FIG. 9 illustrates a case, in which the substrate type sensor 600 is inclined by θ when the wafer is supported on the support member 540. It is assumed that the first sensor 621 generates a unique error of (0.64°, 0.42°) in a coordinate of (Level X, Level Y) in a first temperature atmosphere of around 70° C. Furthermore, it is assumed that the second sensor 622 generates a unique error of (0.61°, 0.43°) in a coordinate of (Level X, Level Y) in a temperature atmosphere of around 70° C.

It is assumed that a vector coordinate is (0.07°, −0.05°) when the substrate type sensor 600 is inclined by θ in a state, in which the substrate type sensor 600 is provided at the first angle. A measurement value V1 of the first sensor 621 measured in a state, in which the substrate type sensor 600 is provided at the first angle according to the first operation is (0.71°, 0.37°) and a measurement value V1 of the second sensor 622 is (0.68°, 0.38°). Furthermore, a measurement value V2 of the first sensor 621 measured in a state, in which the substrate type sensor 600 is provided at the second angle according to the second operation is (0.54°, 0.48°), and a measurement value V2 of the second sensor 622 is (0.57°, 0.47°). Values that are substantially measured are present when the wafer is provided to be supported horizontally, and also, the measurement values are measured by adding unique errors of the sensors in a vector sum. Accordingly, it is determined that the state is not a horizontal state when V1−V2 is not (0.00°, 0.00°) in the first sensor 621.

A comparison result is as in Table 2.

TABLE 2

Measurement Values in State of FIG. 9 in First Temperature Atmosphere

|  | Unique error in atmosphere of first temperature | Measurement value V1 at first angle | Measurement value V2 at second angle | V1 − V2 | Determinaton |
|---|---|---|---|---|---|
| First sensor 621 | (0.64°, 0.42°) | (0.71°, 0.37°) | (0.57°, 0.47°) | (0.14°, −0.1°) | Inclined |
| Second sensor 622 | (0.61°, 0.43°) | (0.68°, 0.38°) | (0.54°, 0.48°) | (0.14°, −0.1°) | Inclined |

A location of the first sensor 621 at the first angle in the first operation becomes a location of the second sensor 622 at the second angle, at which the substrate type sensor 600 is rotated by 180°, in the second operation. A location of the second sensor 622 at the first angle in the first operation becomes a location of the first sensor 621 at the second angle, at which the substrate type sensor 600 is rotated by 180°, in the second operation.

Furthermore, as the directions of the sensors become opposite, the measurement values of the first sensor 621 and the second sensor 622 at the second angle are measured as an inclination angle of (−0.07, 0.05), which constitutes some of the measurement values. That is, because V1 is (a unique error of Level X, a unique error of Level Y)+(0.07°, −0.05°) and V2 is (a unique error of Level X, a unique error of Level Y)+(−0.07°, +0.05°), the inclination angle θ may be obtained from a formula of (V1−V2)/2. According to an embodiment, θ=(V1−V2)/2=(0.07°, −0.05°).

In another aspect, the inclination angle may be measured with reference to a measurement location.

TABLE 3

Calculation of Measurement Values in State of FIG. 9 in First Temperature Atmosphere and Inclination Value according to Another Aspect

| | No. 1 location (Upper portion of first support pin 546a) | | No. 2 location (Upper portion of first support pin 546d) | |
|---|---|---|---|---|
| | Level X | Level Y | Level X | Level Y |
| First angle | ⓐ 1X = 0.71° (First sensor) | ⓐ 1Y = 0.37° (First sensor) | ⓑ 1X = 0.68° (Second sensor) | ⓑ 1Y = 0.38° (Second sensor) |
| Second angle | ⓑ 2X = 0.54° (Second sensor) | ⓑ 2Y = 0.48° (Second sensor) | ⓐ 2X = 0.57° (First sensor) | ⓐ 2Y = 0.47° (First sensor) |
| Inclination angle | {(ⓐ1X − ⓐ2X) + (ⓑ1X − ⓑ2X)}/ 4 = 0.07° | {(ⓐ1Y − ⓐ2Y) + (ⓑ1Y − ⓑ2Y)}/ 4 = −0.05° | {(ⓑ1X − ⓑ2X) + (ⓐ1X − ⓐ2X)}/ 4 = 0.07° | {(ⓑ1Y − ⓑ2Y) + (ⓐ1Y − ⓐ2Y)}/ 4 = −0.05° |

According to another aspect of the inventive concept, the inclination angle may be calculated through {(ⓐ1−ⓐ2)+(ⓑ1−ⓑ2)}/4. The substrate type sensor 600 described in FIGS. 5 to 9 may be obtained the same result only with the first sensor 621, but it is possible to verify a validity by providing the second sensor 622. Furthermore, an inclination of a higher accuracy may be calculated through an average of the inclination values derived by using the first sensor 621 and the second sensor 622.

Figure 10:
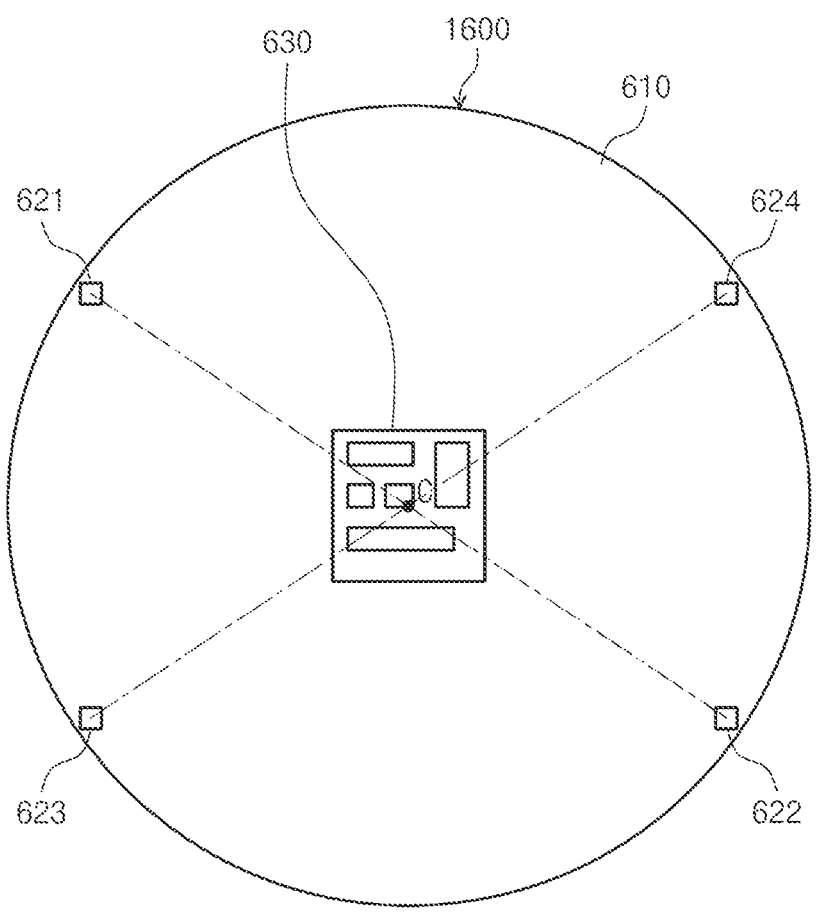
FIG. 10 is a plan view of a substrate type sensor according to another embodiment of the inventive concept.
Figure 11:
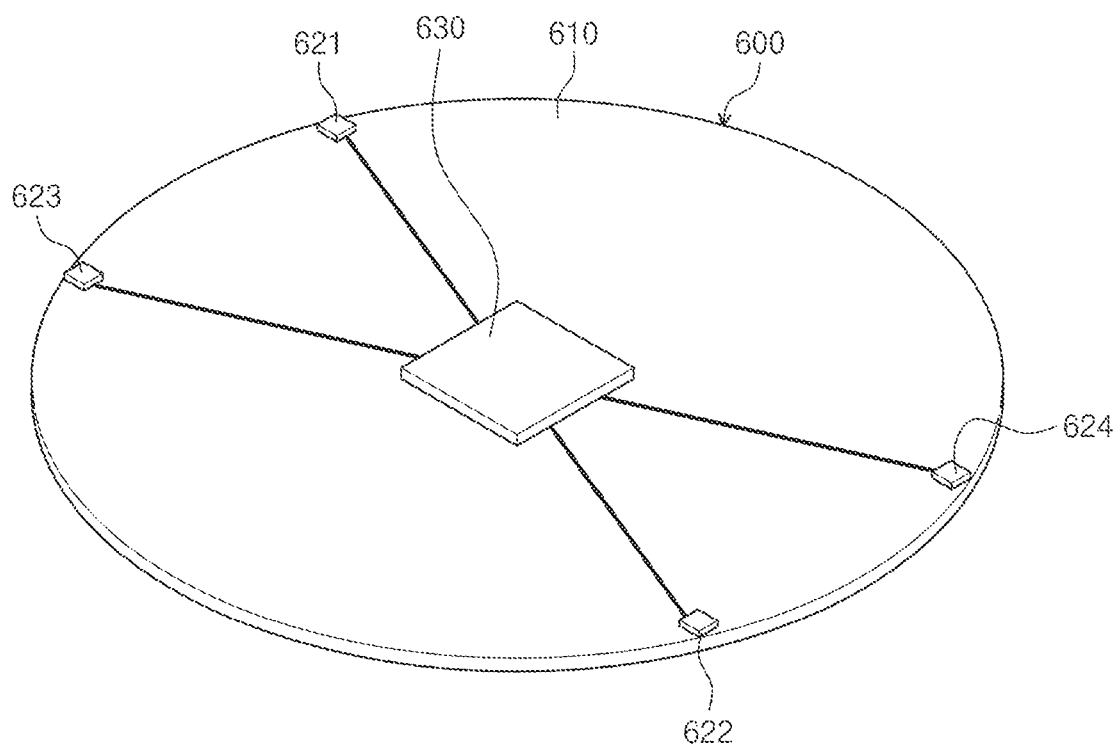
FIG. 11 is a perspective view of the substrate type sensor according to the embodiment of FIG. 10.

FIG. 10 is a plan view of a substrate type sensor 1600 according to another embodiment of the inventive concept. FIG. 11 is a perspective view of the substrate type sensor 1600 according to the embodiment of FIG. 10. Referring to FIGS. 10 and 11, the substrate type sensor 1600 according to another embodiment will be described. When the substrate type sensor 1600 is used, it may be determined whether the wafer "W" may be supported horizontally by the support member 540. For example, the substrate type sensor 1600 may measure differences of the heights of the uppermost ends of the support pins 546 in unit of not more than 0.1 degrees, and may identify whether the heights of the uppermost ends of the support pins 546 are the same during the process.

The substrate type sensor 1600 includes one or more sensors. The sensor may be an IMU. The sensors provided to the substrate type sensor 600 include the first sensor 621 and the second sensor 622. Moreover, a third sensor 623 and a fourth sensor 624 may be further included. The first sensor 621, the second sensor 622, the third sensor 623, and the fourth sensor 624 are IMUs.

The first sensor 621 and the second sensor 622 may be located at locations that are opposite to each other with respect to a center "C" of the substrate type sensor 600. The first sensor 621 and the second sensor 622 may be located at edges of the substrate type sensor 600. In an embodiment, the first sensor 621 and the second sensor 622 may be disposed to be located at upper portions of the support pins 546. In more detail, the first sensor 621 may be located at an upper portion of the first support pin 546a, and the second sensor 622 may be located at an upper portion of the fourth support pin 546d. An angle defined by the first sensor 621 and the second sensor 622 with respect to the center "C" of the substrate type sensor 600 may be 180 degrees.

The third sensor 623 and the fourth sensor 624 may be located at locations that are opposite to each other with respect to a center "C" of the substrate type sensor 600. The third sensor 623 and the fourth sensor 624 may be located at edges of the substrate type sensor 600. In an embodiment, the third sensor 623 and the fourth sensor 624 may be disposed to be located at upper portions of the support pins 546. In more detail, the third sensor 623 may be located at an upper portion of the second support pin 546b, and the fourth sensor 624 may be located at an upper portion of the third support pin 546c. An angle defined by the third sensor 623 and the fourth sensor 624 with respect to the center "C" of the substrate type sensor 600 may be 180 degrees.

The substrate type sensor 1600 includes the central module 630. The central module 630 may include a communication device that receives data from the first sensor 621, the second sensor 622, the third sensor 623, and/or the fourth sensor 624, a storage device that stores data, a transmitter that transmits data, and a power source that provides electric power to the configurations. The first sensor 621 and the central module 630 may be connected to each other such that the data acquired by the first sensor 621 may be received by the central module 630. The second sensor 622 and the central module 630 may be connected to each other such that the data acquired by the second sensor 622 may be received by the central module 630. The third sensor 623 and the central module 630 may be connected to each other such that the data acquired by the third sensor 623 may be received by the central module 630. The fourth sensor 624 and the central module 630 may be connected to each other such that the data acquired by the fourth sensor 624 may be received by the central module 630. The transmitter may be provided by a wireless communication module. Through the data transmitted by the transmitter, calculations that will be described below may be made by a device provided to an outside. Furthermore, a calculator is provided to the central module 630 and the calculations that will be described below are made by the calculator whereby an inclination generated by the support member 540 may be transmitted to an external device through the transmitter.

Figure 12:
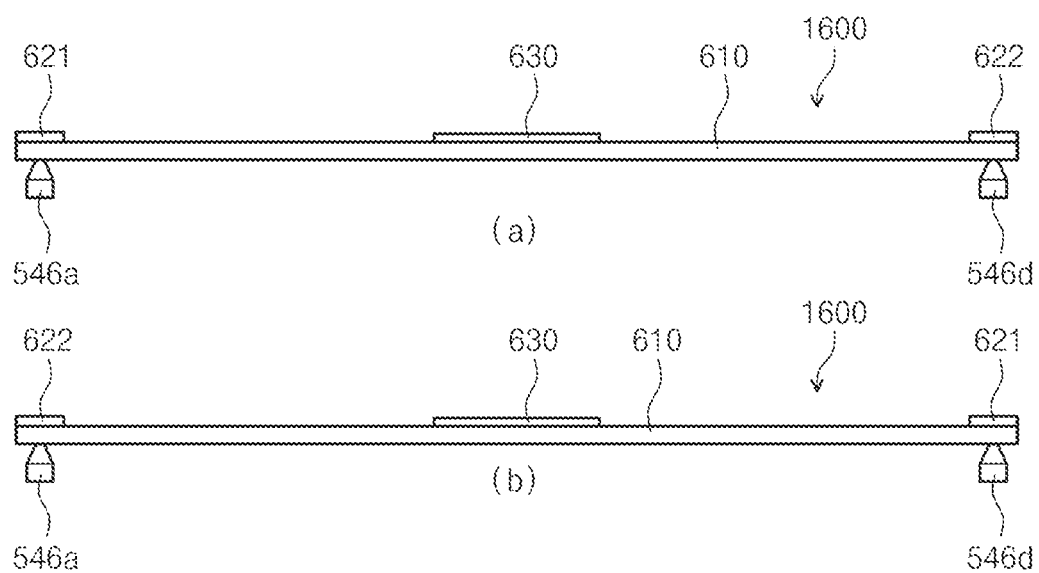
FIG. 12 illustrates a method for determining whether a support member may support a wafer horizontally by using the substrate type sensor according to the embodiment of FIG. 10, and illustrates a case, in which the support member may support the wafer horizontally.
Figure 13:
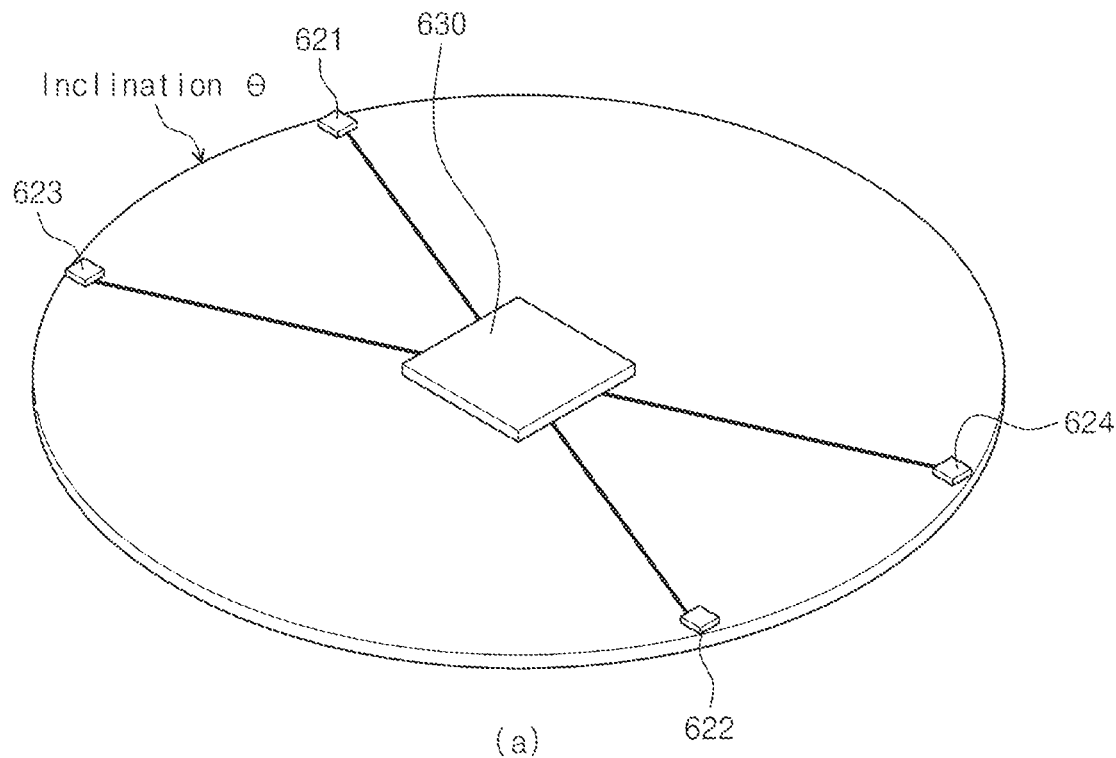
FIG. 13 illustrates a method for determining whether a support member may support a wafer horizontally by using the substrate type sensor according to the embodiment of FIG. 10, and illustrates an example, in which the support member cannot support the wafer horizontally, and illustrates a case, in which the support member is inclined by θ when the wafer is supported by the support member.
Figure 13:
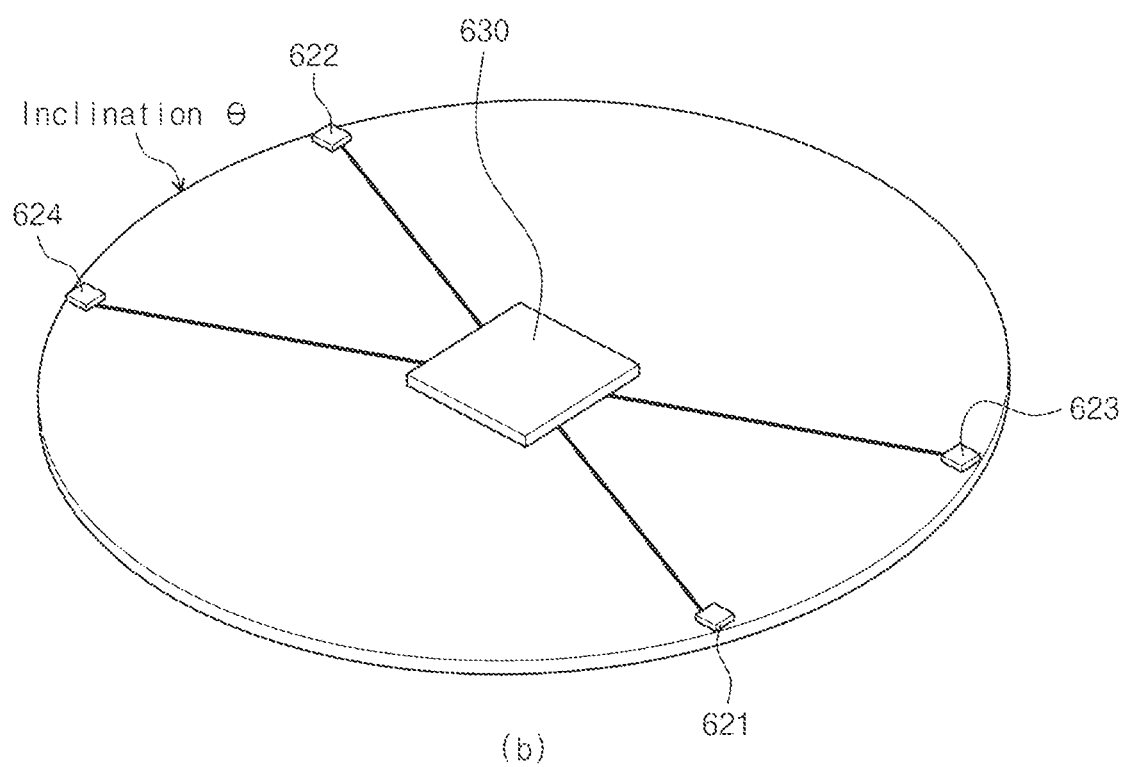

FIG. 12 illustrates a method for determining whether a support member may support a wafer horizontally by using the substrate type sensor 1600 according to the embodiment of FIG. 10, and illustrates a case, in which the support member may support the wafer horizontally. FIG. 13 illustrates a method for determining whether a support member may support a wafer horizontally by using the substrate type sensor 1600 according to the embodiment of FIG. 10, and illustrates an example, in which the support member cannot support the wafer horizontally, and illustrates a case, in which the support member is inclined by θ when the wafer is supported by the support member. Referring to FIGS. 12 and 13, a method for measuring a horizontality of the support member 540 by using the substrate type sensor 1600 will be described.

According to an embodiment, the substrate type sensor 1600 includes a first operation of measuring an inclination of the support member 540 in a state, in which the substrate type sensor 1600 is provided at a first angle, and a second operation of measuring an inclination of the support member 540 in a state, in which the substrate type sensor 1600 is provided at a second angle. The second angle is a state, in which the substrate type sensor 1600 is rotated from the first angle by 180 degrees. FIG. 12A and FIG. 13A illustrate an inclination measurement state according to the first operation, and FIG. 12B and FIG. 13B illustrate an inclination measurement state according to the second operation. The substrate type sensor 1600 may be rotated from the first angle to the second angle through an aligner provided to an outside of the supercritical treatment apparatus 500. For example, the substrate type sensor 1600 including the aligner that aligns the substrate in the buffer unit 200 may be rotated. The rotated substrate type sensor 1600 may be fed by the transfer robot 320 and may be located in the support member 540.

In a state, in which the substrate type sensor 1600 is provided at the first angle according to the first operation, the first sensor 621 may be located above the first support pin 546a and the second sensor 622 may be located above the fourth support pin 546d. Furthermore, the third sensor 623 may be located at an upper portion of the second support pin 546b, and the fourth sensor 624 may be located at an upper portion of the third support pin 546c.

In a state, in which the substrate type sensor 1600 is provided at the second angle according to the second operation, the first sensor 621 may be located above the fourth support pin 546d and the second sensor 622 may be located above the first support pin 546a. Furthermore, the third sensor 623 may be located at an upper portion of the third support pin 546c, and the fourth sensor 624 may be located at an upper portion of the second support pin 546b.

Locations of the first sensor 621, the second sensor 622, the third sensor 623, and the fourth sensor 624 are simple examples, and the inventive concept is not limited to the above-described locations. Meanwhile, the inventor(s) recognizes that a horizontal state of the support member 540 may be derived most accurately when the sensors are located above the support pins 546. However, because the plurality of support pins 546 may be provided at locations that are different from those of the embodiment of the inventive concept according to designs, the location of the sensor according to the first angle may be properly modified in consideration of general technical common senses.

The measurement values of the first sensor 621, the second sensor 622, the third sensor 623, and the fourth sensor 624 may be changed according to temperature. As described above, this is an essential feature of the IMU. According to an embodiment of the inventive concept, a horizontal state may be determined in spite of a change in a measurement value according to temperature, by measuring the inclination in a state, in which the substrate type sensor 1600 is provided at the first angle and measuring the inclination in a state, in which the substrate type sensor 600 is provided at the second angle.

As an example, an atmosphere of a first temperature (a temperature that is higher than a room temperature, for example, a temperature around 70° C.) is assumed. It is assumed that the first sensor 621 generates a unique error of (0.64°, 0.42°) in a coordinate of (Level X, Level Y) in a temperature atmosphere of around 70° C. Furthermore, it is assumed that the second sensor 622 generates a unique error of (0.61°, 0.43°) in a coordinate of (Level X, Level Y) in a temperature atmosphere of around 70° C.

It is assumed that the third sensor 623 generates a unique error of (0.62°, 0.43°) in a coordinate of (Level X, Level Y) in a temperature atmosphere of around 70° C. Furthermore, it is assumed that the fourth sensor 624 generates a unique error of (0.65°, 0.42°) in a coordinate of (Level X, Level Y) in a temperature atmosphere of around 70° C.

When the support member may horizontally support the wafer as illustrated in FIG. 12 when a value of the IMU is (0.00°, 0.00°) in a horizontal state, a measurement value V1 of the first sensor 621 measured in a state, in which the substrate type sensor 600 is provided at the first angle according to the first operation is (0.64°, 0.42°), a measurement value V1 of the second sensor 622 is (0.61°, 0.43°), a measurement value V1 of the third sensor 623 is (0.62°, 0.43°), and a measurement value V1 of the fourth sensor 624 is (0.65°, 0.42°). Furthermore, a measurement value V2 of the first sensor 621 measured in a state, in which the substrate type sensor 600 is provided at the second angle according to the second operation is (0.64°, 0.42°), a measurement value V2 of the second sensor 622 is (0.61°, 0.43°), a measurement value V2 of the third sensor 623 is (0.62°, 0.43°), and a measurement value V2 of the fourth sensor 624 is (0.65°, 0.42°). Values that are measured substantially when the wafer is provided to be supported horizontally are only unique errors of the sensors, and thus a horizontal state is determined when V1-V2 is (0.00°, 0.00°). However, a mathematical value of (0.00°, 0.00°) in the embodiment of the inventive concept is expressed, but the horizontal state is determined in a state that may be substantially considered as (0.00°, 0.00°). For example, when a range of (±0.05°, ±0.05°) is evaluated as being horizontal, the horizontal state is determined even though the value is not (0.00°, 0.00°) mathematically.

A comparison result is as in Table 4.

TABLE 4

Measurement values in State of FIG. 12 in First Temperature Atmosphere

| | Unique error in atmosphere of first temperature | Measurement value V1 at first angle | Measurement value V2 at second angle | V1 − V2 | Determination |
|---|---|---|---|---|---|
| First sensor (621) | (0.64°, 0.42°) | (0.64°, 0.42°) | (0.64°, 0.42°) | (0.00°, 0.00°) | Horizontal |
| Second sensor (622) | (0.61°, 0.43°) | (0.61°, 0.43°) | (0.61°, 0.43°) | (0.00°, 0.00°) | Horizontal |
| Third sensor (623) | (0.62°, 0.43°) | (0.62°, 0.43°) | (0.62°, 0.43°) | (0.00°, 0.00°) | Horizontal |
| Fourth sensor (624) | (0.65°, 0.42°) | (0.65°, 0.42°) | (0.65°, 0.42°) | (0.00°, 0.00°) | Horizontal |

FIG. 13 illustrates a case, in which the support member 540 is inclined by θ when the wafer is supported on the support member 540. It is assumed that the first sensor 621 generates a unique error of (0.64°, 0.42°) in a coordinate of (Level X, Level Y) in a first temperature atmosphere of around 70° C. It is assumed that the second sensor 622 generates a unique error of (0.61°, 0.43°) in a coordinate of (Level X, Level Y) in a temperature atmosphere of around 70° C. It is assumed that the third sensor 623 generates a unique error of (0.62°, 0.43°) in a coordinate of (Level X, Level Y) in a temperature atmosphere of around 70° C. Furthermore, it is assumed that the fourth sensor 624 generates a unique error of (0.65°, 0.42°) in a coordinate of (Level X, Level Y) in a temperature atmosphere of around 70° C.

It is assumed that a vector coordinate is (0.07°, −0.05°) when the substrate type sensor 1600 is inclined by θ in a state, in which the substrate type sensor 600 is provided at the first angle. A measurement value V1 of the first sensor 621 measured in a state, in which the substrate type sensor 600 is provided at the first angle according to the first operation is (0.71°, 0.37°), a measurement value V1 of the second sensor 622 is (0.68°, 0.38°), a measurement value V1 of the third sensor 623 is (0.69°, 0.38°), and a measurement value V1 of the fourth sensor 624 is (0.72°, 0.37°). Furthermore, a measurement value V2 of the first sensor 621 measured in a state, in which the substrate type sensor 600 is provided at the second angle according to the second operation is (0.57°, 0.47°), and a measurement value V2 of the second sensor 622 is (0.54°, 0.48°). The third sensor 623 is (0.55°, 0.48°), and the fourth sensor 624 is (0.58°, 0.47°). Values that are substantially measured are present when the wafer is provided to be supported horizontally, and also, the measurement values are measured by adding unique errors of the sensors in a vector sum. Accordingly, it is determined that the state is not a horizontal state when V1−V2 is not (0.00°, 0.00°) in the first sensor 621, the second sensor 622, the third sensor 623, and/or the fourth sensor 624.

A comparison result is as in Table 5.

TABLE 5

Measurement Values in State of FIG. 13 in First Temperature Atmosphere

| | Unique error in atmosphere of first temperature | Measurement value V1 at first angle | Measurement value V2 at second angle | V1 − V2 | Determination |
|---|---|---|---|---|---|
| First sensor (621) | (0.64°, 0.42°) | (0.71°, 0.37°) | (0.57°, 0.47°) | (0.14, −0.1) | Inclined |
| Second sensor (622) | (0.61°, 0.43°) | (0.68°, 0.38°) | (0.54°, 0.48°) | (0.14, −0.1) | Inclined |
| Third sensor (623) | (0.62°, 0.43°) | (0.69°, 0.38°) | (0.55°, 0.48°) | (0.14, −0.1) | Inclined |
| Fourth sensor (624) | (0.65°, 0.42°) | (0.72°, 0.37°) | (0.58°, 0.47°) | (0.14, −0.1) | Inclined |

A location of the first sensor 621 at the first angle in the first operation becomes a location of the second sensor 622 at the second angle, at which the substrate type sensor 600 is rotated by 180°, in the second operation. A location of the second sensor 622 at the first angle in the first operation becomes a location of the first sensor 621 at the second angle, at which the substrate type sensor 600 is rotated by 180°, in the second operation. A location of the third sensor 623 at the first angle in the first operation becomes a location of the fourth sensor 624 at the second angle, at which the substrate type sensor 600 is rotated by 180°, in the second operation. A location of the fourth sensor 624 at the first angle in the first operation becomes a location of the third sensor 623 at the second angle, at which the substrate type sensor 600 is rotated by 180°, in the second operation. Furthermore, as the directions of the sensors become opposite, the measurement values of the first sensor 621 and the second sensor 622 at the second angle are measured as an inclination angle θ of (−0.07, 0.05), which constitutes some of the measurement values. That is, because V1 is (a unique error of Level X, a unique error of Level Y)+(0.07°, −0.05°) and V2 is (a unique error of Level X, a unique error of Level Y)+(−0.07°, +0.05°), the inclination angle θ may be obtained from a formula of (V1−V2)/2. According to an embodiment, 0=(V1−V2)/2=(0.07°, −0.05°).

In another aspect, the inclination angle may be measured with reference to a measurement location.

an inclination angle according to another embodiment of the inventive concept will be described.

FIG. 8 illustrates a method for determining whether the support member 540 may support a wafer horizontally by using the substrate type sensor 600 according to an embodiment of the inventive concept, and illustrates a case, in which the support member may support the wafer horizontally. FIG. 9 illustrates a method for determining whether a support member may support a wafer horizontally by using the substrate type sensor 600 according to an embodiment of the inventive concept, and illustrates an example, in which the support member cannot support the wafer horizontally, and illustrates a case, in which the support member is inclined by θ when the wafer is supported by the support member. Referring to FIGS. 8 and 9, a method for measuring a horizontality of a support member by using the substrate type sensor 600 will be described.

According to an embodiment, the substrate type sensor 600 include a first operation of measuring an inclination of the support member 540 in a state, in which the substrate type sensor 600 is provided at a first angle, and a second operation of measuring an inclination of the support member 540 in a state, in which the substrate type sensor 600 is provided at a second angle. The second angle is a state, in which the substrate type sensor 600 is rotated from the first angle by 180 degrees. FIG. 8A and FIG. 9A illustrate an inclination measurement state according to the first opera-

TABLE 6

Calculation of Measurement Values in State of FIG. 9 in First Temperature Atmosphere and Inclination Value according to Another Aspect

| | No. 1 location (Upper portion of first support pin 546a) | | No. 2 location (Upper portion of fourth support in 546d) | |
|---|---|---|---|---|
| | Level X | Level Y | Level X | Level Y |
| First angle | ⓐ 1X = 0.71° (First sensor) | ⓐ 1Y = 0.37° (First sensor) | ⓑ 1X = 0.68° (Second sensor) | ⓑ 1Y = 0.38° (Second sensor) |
| Second angle | ⓑ 2X = 0.54° (Second sensor) | ⓑ 2Y = 0.48° (Second sensor) | ⓐ 2X = 0.57° (First sensor) | ⓐ 2Y = 0.47° (First sensor) |
| Inclination angle | {(ⓐ 1X − ⓐ 2X) + (ⓑ 1X − ⓑ 2X)}/ 4 = 0.07° | {(ⓐ 1Y − ⓐ 2Y) + (ⓑ 1Y − ⓑ 2Y)}/ 4 = −0.05° | {(ⓑ 1X − ⓑ 2X) + (ⓐ 1X − ⓐ 2X)}/ 4 = 0.07° | {(ⓑ 1Y − ⓑ 2Y) + (ⓐ 1Y − ⓐ 2Y)}/ 4 = −0.05° |

| | No. 3 location (Upper portion of second support pin 546b) | | No. 4 location (Upper portion of third support pin 546c) | |
|---|---|---|---|---|
| | Level X | Level Y | Level X | Level Y |
| First angle | ⓒ 1X = 0.69° (Third sensor) | ⓒ 1Y = 0.38° (Third sensor) | ⓒ 1X = 0.72° (Fourth sensor) | ⓒ 1Y = 0.37° (Fourth sensor) |
| Second angle | ⓓ 2X = 0.55° (Fourth sensor) | ⓓ 2Y = 0.48° (Fourth sensor) | ⓓ 2X = 0.58° (Third sensor) | ⓓ 2Y = 0.47° (Third sensor) |
| Inclination angle | {(ⓒ 1X − ⓒ 2X) + (ⓓ 1X − ⓓ 2X)}/ 4 = 0.07° | {(ⓒ 1Y − ⓒ 2Y) + (ⓓ 1Y − ⓓ 2Y)}/ 4 = −0.05° | {(ⓓ 1X − ⓓ 2X) + (ⓒ 1X − ⓒ 2X)}/ 4 = 0.07° | {(ⓓ 1Y − ⓓ 2Y) + (ⓒ 1Y − ⓒ 2Y)}/ 4 = −0.05° |

According to another aspect of the inventive concept, the inclination angle may be calculated through {(ⓐ$_1$−ⓐ$_2$)+(ⓑ$_1$−ⓑ$_2$)}/4 and {(ⓒ$_{1X}$−ⓒ$_{2x}$)+(ⓓ$_{1X}$−ⓓ$_{2x}$)}/4. Furthermore, an inclination of a higher accuracy may be calculated through an average of the inclination values derived by using the first sensor 621, the second sensor 622, the third sensor 623, and the fourth sensor 624. In the following, a method for calculating an inclination value according to another embodiment will be described.

According to another embodiment, a sensor provided to the substrate type sensor 600 is a 3-axis acceleration sensor. Referring to FIGS. 8 to 12 again, a method for calculating tion, and FIG. 8B and FIG. 9B illustrate an inclination measurement state according to the second operation. The substrate type sensor 600 may be rotated from the first angle to the second angle through an aligner provided to an outside of the supercritical treatment apparatus 500. For example, the substrate type sensor 600 may be rotated using the aligner that aligns the substrate in the buffer unit 200. The rotated substrate type sensor 600 may be fed by the transfer robot 320 and may be located in the support member 540.

In a state, in which the substrate type sensor 600 is provided at the first angle according to the first operation, the first sensor 621 may be located above the first support pin 546a and the second sensor 622 may be located above the fourth support pin 546d. In a state, in which the substrate type sensor 600 is provided at the second angle according to the second operation, the first sensor 621 may be located above the fourth support pin 546d and the second sensor 622 may be located above the first support pin 546a. Locations of the first sensor 621 and the second sensor 622 are simple examples, and the inventive concept is not limited to the above-described locations. Meanwhile, the inventor(s) recognizes that a horizontal state of the support member 540 may be derived most accurately when the sensors are located above the support pins 546. However, because the plurality of support pins 546 may be provided at locations that are different from those of the embodiment of the inventive concept according to designs, the location of the sensor according to the first angle may be properly modified in consideration of general technical common senses.

The measurement values of the first sensor 621 and the second sensor 622 may be changed according to temperature. As described above, this is an essential feature of the acceleration sensor. According to an embodiment of the inventive concept, a horizontal state may be determined in spite of a change in a measurement value according to temperature, by measuring the inclination in a state, in which the substrate type sensor 600 is provided at the first angle and measuring the inclination in a state, in which the substrate type sensor 600 is provided at the second angle.

As an example, an atmosphere of a first temperature (a temperature that is higher than a room temperature, for example, a temperature around 70° C.) is assumed. It is assumed that the first sensor 621 generates a unique error of (1, 1, −1) in a vector coordinate of (X, Y, Z) in a temperature atmosphere of around 70° C. Furthermore, it is assumed that the second sensor 622 generates a unique error of (0.8, 0.7, −1.1) in a coordinate of (X, Y, Z) in a temperature atmosphere of around 70° C.

When the support member may horizontally support the wafer as illustrated in FIG. 8 when a value of the acceleration sensor is (0, 0, −9.8) in a horizontal state, a measurement value V1 of the first sensor 621 measured in a state, in which the substrate type sensor 600 is provided at the first angle according to the first operation is (1, 1, −10.8), and a measurement value V1 of the second sensor 622 is (0.8, 0.7, −10.9). Furthermore, a measurement value V2 of the first sensor 621 measured in a state, in which the substrate type sensor 600 is provided at the second angle according to the second operation is (1, 1, −10.8), and a measurement value V2 of the second sensor 622 is (0.8, 0.7, −10.9). Values that are measured substantially when the wafer is provided to be supported horizontally are only a value corresponding to the Z value and unique errors of the sensors, and thus a horizontal state is determined when V1−V2 is (0, 0, 0). However, a mathematical value of (0, 0, 0) in the embodiment of the inventive concept is expressed, but the horizontal state is determined in a state that may be substantially considered as (0, 0, 0). For example, when a range of (±0.05, ±0.05, ±0.05) is evaluated as being horizontal, the horizontal state is determined even though the value is not (0, 0, 0) mathematically.

A comparison result is as in Table 7.

TABLE 7

| | Measurement values in State of FIG. 8 in First Temperature Atmosphere | | | | |
|---|---|---|---|---|---|
| | Unique error in atmosphere of first temperature | Measurement value V1 at first angle | Measurement value V2 at second angle | V1 − V2 | Determination |
| First sensor (621) | (1, 1, −1) | (1, 1, −10.8) | (1, 1, −10.8) | (0, 0, 0) | Horizontal |
| Second sensor (622) | (0.8, 0.7, −1.1) | (0.8, 0.7, −10.9) | (0.8, 0.7, −10.9) | (0, 0, 0) | Horizontal |

FIG. 9 illustrates a case, in which the support member 540 is inclined by θ when the wafer is supported on the support member 540. It is assumed that the first sensor 621 generates a unique error of (1, 1, −1) in a vector coordinate of (X, Y, Z) in a temperature atmosphere of around 70° C. Furthermore, it is assumed that the second sensor 622 generates a unique error of (0.8, 0.7, −1.1) in a coordinate of (X, Y, Z) in a temperature atmosphere of around 70° C.

It is assumed that a vector coordinate is (2, 0.5, −9.56) when the substrate type sensor 600 is inclined by θ in a state, in which the substrate type sensor 600 is provided at the first angle. A measurement value V1 of the first sensor 621 measured in a state, in which the substrate type sensor 600 is provided at the first angle according to the first operation is (3, 1.5, −10.3) and a measurement value V1 of the second sensor 622 is (2.8, 1.2, −10.4). Furthermore, a measurement value V2 of the first sensor 621 measured in a state, in which the substrate type sensor 600 is provided at the second angle according to the second operation is (−1, 0.5, −10.3), and a measurement value V2 of the second sensor 622 is (−1.2, 0.2, −10.4). Values that are substantially measured are present when the wafer is provided to be supported horizontally, and also, the measurement values are measured by adding unique errors of the sensors in a vector sum. Accordingly, it is determined that the state is not a horizontal state when V1−V2 is not (0.00°, 0.00°) in the first sensor 621 and V1−V2 is (2.8, 1, 0) in the second sensor 622.

A comparison result is as in Table 8.

TABLE 8

Measurement values in State of FIG. 9 in First Temperature Atmosphere

| | Unique error in atmosphere of first temperature | Measurement value V1 at first angle | Measurement value V2 at second angle | V1 − V2 | Determination |
|---|---|---|---|---|---|
| First sensor (621) | (1, 1, −1) | (3, 1.5, −10.3) | (−1, 0.5, −10.3) | (4, 1, 0) | Inclined |
| Second sensor (622) | (0.8, 0.7, −1.1) | (2.8, 1.2, −10.4) | (−1.2, 0.2, −10.4) | (4, 1, 0) | Inclined |

An X value and a Y value of a vector coordinate when the substrate type sensor 600 is inclined by θ in a state, in which the substrate type sensor 600 is provided at the first angle may be known through (V1−V2)/2. (V1−V2)/2 is (x, y, 0). Accordingly, when it is determined that the support member is not in a horizontal state, an inclination angle may be determined through a formula. In the present embodiment, (V1−V2)/2=(x, y, 0)=(2, 0.5, 0). Here, when it is considered that a "g" value of an acceleration used in an acceleration sensor is the gravitational acceleration of the earth, a "z" value of an inclination θ for a plane may be obtained as a value of g*sin(a) because an "x" value and a "y" value are known as referenced through FIG. 15 when the "z" value is calculated by using a polar coordinate. In another method, the 'z" value may be obtained through $|z|=\sqrt{g^2-(\sqrt{x^2+y^2})}$ by using the Pythagorean theorem. The "z" value is obtained as −|z| in consideration of the gravitational direction. A vector coordinate when the substrate type sensor 600 is inclined by θ in a state, in which the substrate type sensor 600 is provided at the first angle may be obtained as $$\left(\frac{V1(x)-V2(x)}{2}, \frac{V1(y)-V2(y)}{2}, -\sqrt{g^2-\sqrt{x^2+y^2}}\right)$$

by using the acceleration sensor.

Furthermore, (a unique error of an X value, a unique error of a Y value, a Z value of V1 (or V2)) may be driven through (V1+V2)/2. For example, in the present example, (V1+V2)/2 is (1, 1, −10.3) in the case of the first sensor 621 and (V1+V2)/2 is (0.8, 0.7, −10.4) in the case of the second sensor 622. In addition, a unique error of the Z value may be calculated through a difference V1(Z) or V2(Z) and a "z" value of an inclination value of $z=-\sqrt{g^2-(\sqrt{x^2+y^2})}$.

The substrate type sensor 600 described in FIGS. 5 to 9 may be obtained the same result only with the first sensor 621, but it is possible to verify a validity by providing the second sensor 622.

Subsequently, a method according to another embodiment for measuring an inclination value by the substrate type sensor 1600 according to another embodiment of the inventive concept referenced through FIG. 10 will be described with reference to FIGS. 12 and 13. The substrate type sensor 1600 includes one or more sensors. The sensor is a 3-axis or more acceleration sensor.

According to an embodiment, the substrate type sensor 1600 includes a first operation of measuring an inclination of the support member 540 in a state, in which the substrate type sensor 600 is provided at a first angle, and a second operation of measuring an inclination of the support member 540 in a state, in which the substrate type sensor 600 is provided at a second angle. The second angle is a state, in which the substrate type sensor 600 is rotated from the first angle by 180 degrees. FIG. 12A and FIG. 13A illustrate an inclination measurement state according to the first operation, and FIG. 12B and FIG. 13B illustrate an inclination measurement state according to the second operation. The substrate type sensor 1600 may be rotated from the first angle to the second angle through an aligner provided to an outside of the supercritical treatment apparatus 500. For example, the substrate type sensor 1600 may be rotated using the aligner that aligns the substrate in the buffer unit 200. The rotated substrate type sensor 1600 may be fed by the transfer robot 320 and may be located in the support member 540.

In a state, in which the substrate type sensor 1600 is provided at the first angle according to the first operation, the first sensor 621 may be located above the first support pin 546a and the second sensor 622 may be located above the fourth support pin 546d. Furthermore, the third sensor 623 may be located at an upper portion of the second support pin 546b, and the fourth sensor 624 may be located at an upper portion of the third support pin 546c.

In a state, in which the substrate type sensor 600 is provided at the second angle according to the second operation, the first sensor 621 may be located above the fourth support pin 546d and the second sensor 622 may be located above the first support pin 546a. Furthermore, the third sensor 623 may be located at an upper portion of the third support pin 546c, and the fourth sensor 624 may be located at an upper portion of the second support pin 546b.

Locations of the first sensor 621, the second sensor 622, the third sensor 623, and the fourth sensor 624 are simple examples, and the inventive concept is not limited to the above-described locations. Meanwhile, the inventor(s) recognizes that a horizontal state of the support member 540 may be derived most accurately when the sensors are located above the support pins 546. However, because the plurality of support pins 546 may be provided at locations that are different from those of the embodiment of the inventive concept according to designs, the location of the sensor according to the first angle may be properly modified in consideration of general technical common senses.

The measurement values of the first sensor 621, the second sensor 622, the third sensor 623, and the fourth sensor 624 may be changed according to temperature. As described above, this is an essential feature of the acceleration sensor. According to an embodiment of the inventive concept, a horizontal state may be determined in spite of a change in a measurement value according to temperature, by measuring the inclination in a state, in which the substrate type sensor 1600 is provided at the first angle and measuring the inclination in a state, in which the substrate type sensor 600 is provided at the second angle.

As an example, an atmosphere of a first temperature (a temperature that is higher than a room temperature, for example, a temperature around 70° C.) is assumed. It is assumed that the first sensor 621 generates a unique error of (1, 1, −1) in a vector coordinate of (X, Y, Z) in a temperature atmosphere of around 70° C. It is assumed that the second sensor 622 generates a unique error of (0.8, 0.7, −1.1) in a coordinate of (X, Y, Z) in a temperature atmosphere of around 70° C. It is assumed that the third sensor 623 generates a unique error of (0.6, 0.7, −1) in a coordinate of (X, Y, Z) in a temperature atmosphere of around 70° C. Furthermore, it is assumed that the fourth sensor 624 generates a unique error of (0.5, 0.8, −1.2) in a coordinate of (X, Y, Z) in a temperature atmosphere of around 70° C.

When the support member may horizontally support the wafer as illustrated in FIG. 12 when a value of the acceleration sensor is (0, 0, −9.8) in a horizontal state, a measurement value V1 of the first sensor 621 measured in a state, in which the substrate type sensor 600 is provided at the first angle according to the first operation is (1, 1, −10.8), a measurement value V1 of the second sensor 622 is (0.8, 0.7, −10.9), a measurement value V1 of the third sensor 623 is (0.6, 0.7, −10.8), and a measurement value V1 of the fourth sensor 624 is (0.5, 0.8, −11). Furthermore, a measurement value V2 of the first sensor 621 measured in a state, in which the substrate type sensor 600 is provided at the second angle according to the second operation is (1, 1, −10.8), a measurement value V2 of the second sensor 622 is (0.8, 0.7, −10.9), a measurement value V2 of the third sensor 623 is (0.6, 0.7, −10.8), and a measurement value V2 of the fourth sensor 624 is (0.5, 0.8, −11). Values that are measured substantially when the wafer is provided to be supported horizontally are only a value corresponding to the Z value and unique errors of the sensors, and thus a horizontal state is determined when V1−V2 is (0, 0, 0). However, a mathematical value of (0, 0, 0) in the embodiment of the inventive concept is expressed, but the horizontal state is determined in a state that may be substantially considered as (0, 0, 0). For example, when a range of (±0.05, ±0.05, ±0.05) is evaluated as being horizontal, the horizontal state is determined even though the value is not (0, 0, 0) mathematically.

A comparison result is as in Table 9.

TABLE 9

| | Measurement Values in State of FIG. 12 in First Temperature Atmosphere | | | | |
|---|---|---|---|---|---|
| | Unique error in atmosphere of first temperature | Measurement value V1 at first angle | Measurement value V2 at second angle | V1 − V2 | Determination |
| First sensor (621) | (1, 1, −1) | (1, 1, −10.8) | (1, 1, −10.8) | (0, 0, 0) | Horizontal |
| Second sensor (622) | (0.8, 0.7, −1.1) | (0.8, 0.7, −10.9) | (0.8, 0.7, −10.9) | (0, 0, 0) | Horizontal |

TABLE 9-continued

Measurement Values in State of FIG. 12 in First Temperature Atmosphere

| | Unique error in atmosphere of first temperature | Measurement value V1 at first angle | Measurement value V2 at second angle | V1 − V2 | Determination |
|---|---|---|---|---|---|
| Third sensor (623) | (0.6, 0.7, −1) | (0.6, 0.7, −10.8) | (0.6, 0.7, −10.8) | (0, 0, 0) | Horizontal |
| Fourth sensor (624) | (0.5, 0.8, −1.2) | (0.5, 0.8, −11) | (0.5, 0.8, −11) | (0, 0, 0) | Horizontal |

FIG. 13 illustrates a case, in which the support member 540 is inclined by θ when the wafer is supported on the support member 540. It is assumed that the first sensor 621 generates a unique error of (1, 1, −1) in a vector coordinate of (X, Y, Z) in a temperature atmosphere of around 70° C. It is assumed that the second sensor 622 generates a unique error of (0.8, 0.7, −1.1) in a coordinate of (X, Y, Z) in a temperature atmosphere of around 70° C. It is assumed that the third sensor 623 generates a unique error of (0.6, 0.7, −1) in a coordinate of (X, Y, Z) in a temperature atmosphere of around 70° C. Furthermore, it is assumed that the fourth sensor 624 generates a unique error of (0.5, 0.8, −1.2) in a coordinate of (X, Y, Z) in a temperature atmosphere of around 70° C.

It is assumed that a vector coordinate is (2, 0.5, −9.3) when the substrate type sensor 1600 is inclined by θ in a state, in which the substrate type sensor 600 is provided at the first angle. A measurement value V1 of the first sensor 621 measured in a state, in which the substrate type sensor 600 is provided at the first angle according to the first operation is (3, 1.5, −10.3), a measurement value V1 of the second sensor 622 is (2.8, 1.2, −10.4), a measurement value V1 of the third sensor 623 is (−2.6, 4, −10.3), and a measurement value V1 of the fourth sensor 624 is (−2.7, 4.1, −10.5). Furthermore, a measurement value V2 of the first sensor 621 measured in a state, in which the substrate type sensor 600 is provided at the second angle according to the second operation is (1, 0.5, −10.3), and a measurement value V2 of the second sensor 622 is (−1.2, 0.2, −10.4). The third sensor 623 is (3.8, −2.6, −10.3), and the fourth sensor 624 is (3.7, −2.5, −10.5). Values that are substantially measured are present when the wafer is provided to be supported horizontally, and also, the measurement values are measured by adding unique errors of the sensors in a vector sum. Accordingly, it is determined that the state is not a horizontal state when V1−V2 is (2.8, 1.2, 0) in the first sensor 621, V1−V2 is (2.8, 1, 0) in the second sensor 622, V1−V2 is (−6.4, −6.6, 0) in the third sensor 623, and V1−V2 is (−6.4, −6.6, 0) in the fourth sensor 624.

A comparison result is as in Table 10.

TABLE 10

Measurement values in State of FIG. 13 in First Temperature Atmosphere

| | Unique error in atmosphere of first temperature | Measurement value V1 at first angle | Measurement value V2 at second angle | V1 − V2 | Determination |
|---|---|---|---|---|---|
| First sensor (621) | (1, 1, −1) | (3, 1.5, −10.3) | (−1, 0.5, −10.3) | (4, 1, 0) | Inclined |
| Second sensor (622) | (0.8, 0.7, −1.1) | (2.8, 1.2, −10.4) | (−1.2, 0.2, −10.4) | (4, 1, 0) | Inclined |
| Third sensor (623) | (0.6, 0.7, −1) | (−2.6, 4, −10.3) | (3.8, −2.6, −10.3) | (−6.4. −6.6, 0) | Inclined |
| Fourth sensor (624) | (0.5, 0.8, −1.2) | (−2.7, 4.1, −10.5) | (3.7, −2.5, −10.5) | (−6.4. −6.6, 0) | Inclined |

An X value and a Y value of a vector coordinate when the substrate type sensor 600 is inclined by θ in a state, in which the substrate type sensor 600 is provided at the first angle may be known through (V1−V2)/2. (V1−V2)/2=(x, y, 0). Accordingly, when it is determined that the support member is not in a horizontal state, an inclination angle may be determined through formula. In the present embodiment, (V1−V2)/2 derived through the first sensor 621 and the second sensor 622 is (x, y, 0)=(2, 0.5, 0). In the present embodiment, (V1−V2)/2 derived by the third sensor 623 and the fourth sensor 624 is (x, y, 0)=(−3.2, 3.3, 0). These are a difference according to rotation of a coordinate even though the values are different. Here, when it is considered that a g value of an acceleration used in an acceleration sensor is the gravitational acceleration of the earth, a z value of an inclination θ for a plane may be obtained as a value of g*sin(a) because an x value and a y value are known as referenced through FIG. 5 when the z value is calculated by using a polar coordinate. In another method, the z value may be obtained through $|z|=\sqrt{g^2-(\sqrt{x^2+y^2})}$ by using the Pythagorean theorem. The z value is obtained as in consideration of the gravitational direction. A vector coordinate when the substrate type sensor 600 is inclined by Yθ in a state, in which the substrate type sensor 600 is provided at the first angle may be obtained as $$\left(\frac{V1(x)-V2(x)}{2}, \frac{V1(y)-V2(y)}{2}, -\sqrt{g^2-\sqrt{x^2+y^2}}\right)$$

by using the acceleration sensor.

Furthermore, (a unique error of an X value, a unique error of a Y value, a Z value of V1 (or V2)) may be driven through (V1+V2)/2. For example, in the present example, (V1+V2)/2 is (1, 1, −10.3) in the case of the first sensor 621 and (V1+V2)/2 is (0.8, 0.7, −10.4) in the case of the second sensor 622. Furthermore, (V1+V2)/2=(0.6, 0.7, −10.3) in the case of the third sensor 623, and (V1−V2)/2=(x, y, 0)=(0.5, 0.8, −10.5) in the case of the fourth sensor 624. In addition, a unique error of the Z value may be calculated through a difference V1(Z) or V2(Z) and a "z" value of an inclination value of $z=-\sqrt{g^2-(\sqrt{x^2+y^2})}$.

The above-described embodiments and formulas correspond to the embodiment of the inventive concept. An ordinary person in the art may derive various formulas and embodiments that are not disclosed, based on the spirit of the inventive concept described in the specification.

Figure 16:
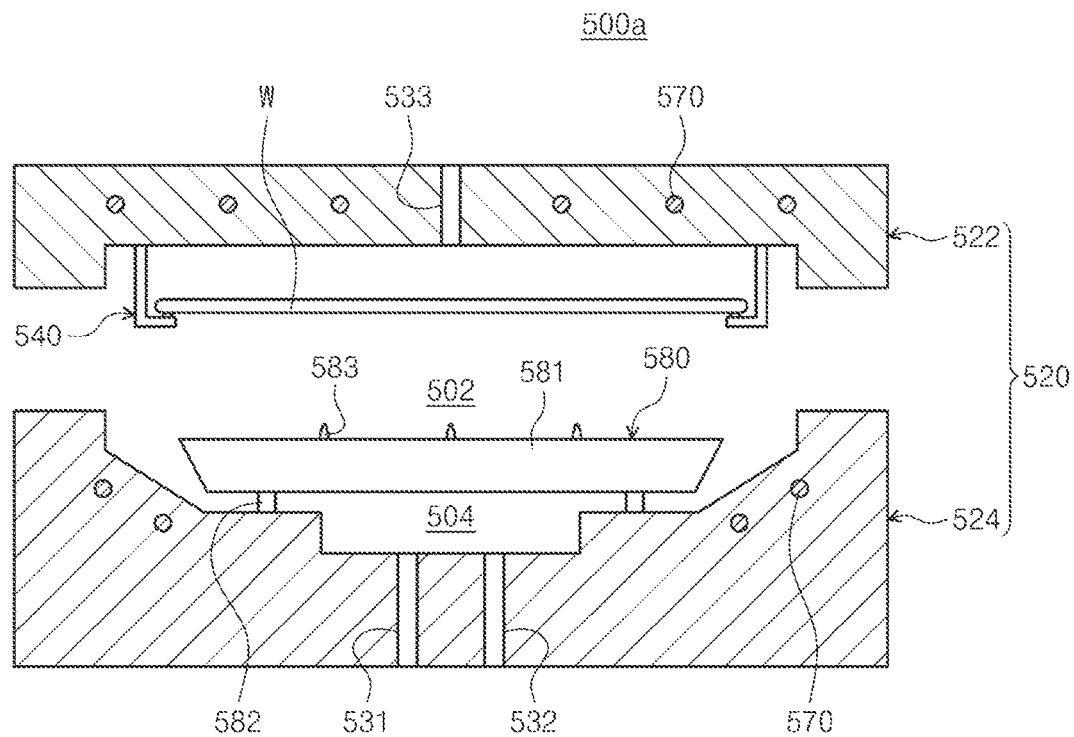
FIG. 16 is a view schematically illustrating another embodiment of the supercritical treatment apparatus of FIG. 1, and is a cross-sectional view illustrating a state, in which a vessel is opened.
Figure 17:
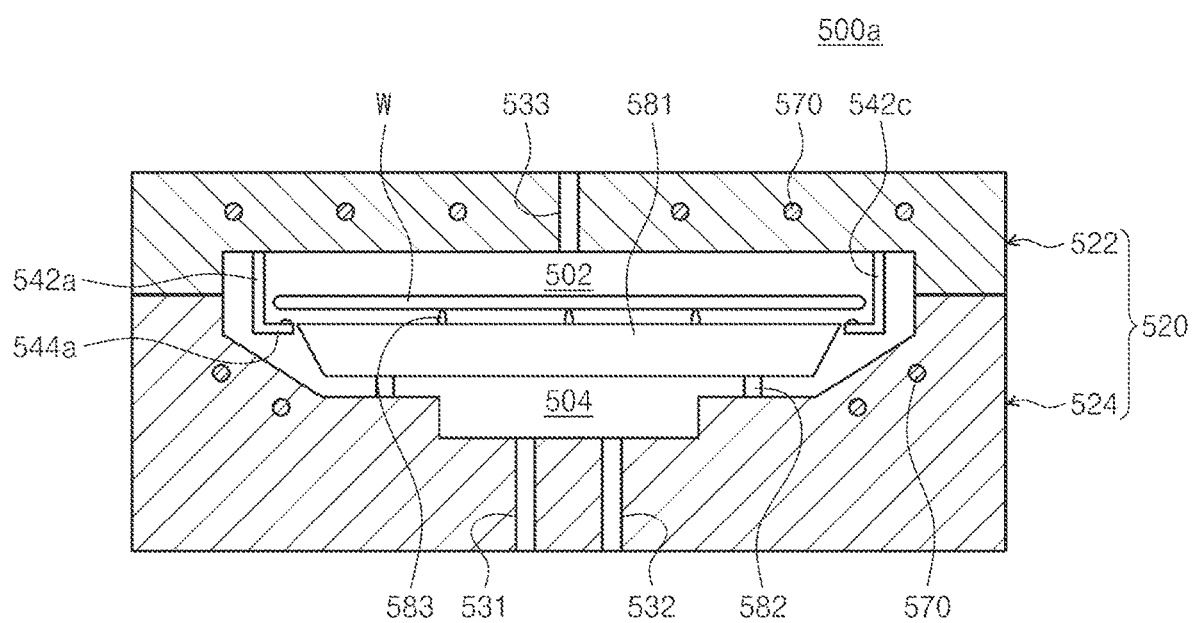
FIG. 17 is a cross-sectional view illustrating a state, in which the vessel of the supercritical treatment apparatus according to the embodiment of FIG. 16 is closed.

FIG. 16 is a view schematically illustrating another embodiment of the supercritical treatment apparatus of FIG. 1, and is a cross-sectional view illustrating a state, in which a vessel is opened. FIG. 17 is a cross-sectional view illustrating a state, in which the vessel of the supercritical treatment apparatus according to the embodiment of FIG. 16 is closed. Another embodiment of the inventive concept will be described with reference to FIGS. 16 and 17.

A substrate treating apparatus 500a may include the vessel 520, a first substrate support part 540, a second substrate support part 583, a first supply port 531, a second supply port 533, and an exhaustion port 532.

The vessel 520 may provide a space for drying the substrate. The space may include a process area 502 and a buffer area 504. The process area 502 may be an area corresponding to an upper surface of the substrate "W", and the buffer area 504 may be an area located below the substrate "W". The vessel 520 may include the upper vessel 522 and the lower vessel 524. The upper vessel 522 may include an upper wall and a first side wall. The upper wall of the upper vessel 522 may be an upper wall of the vessel 520. A first side wall of the upper vessel 522 may be a portion of a side wall of the vessel 520. The lower vessel 524 may include a lower wall and a second side wall. The lower wall of the lower vessel 524 may be a lower wall of the vessel 520. The second side wall of the lower vessel 524 may be a portion of the side wall of the vessel.

As the upper vessel 522 and the lower vessel 524 are relatively moved by a driving mechanism (not illustrated), they may be engaged with each other to be switched between a closing location (illustration of FIG. 17), at which the vessel 520 is closed, and an opening location (illustration of FIG. 16), at which the vessel 520 is opened. For example, at least any one of the upper vessel 522 and the lower vessel 524 may be moved upwards and downwards along an elevation rod (not illustrated) to be coupled to each other or separated from each other. At the opening location of the vessel 520, the substrate "W" may be loaded into or unloaded from an interior of the vessel 520. At the closing location of the vessel 520, a supercritical drying process for the substrate "W" may be performed.

The first substrate support part 540 may be disposed in the vessel 520, and may support the substrate "W" when the substrate "W" is loaded into the vessel. The first substrate support part 540, as illustrated in FIG. 16, may support the substrate "W" when the substrate "W" is loaded into or unloaded from the interior of the vessel at the opening location of the vessel 520. The second substrate support part 583 may be disposed in the vessel 520, and may support the substrate "W" when the substrate "W" is treated in the interior of the vessel 520. The second substrate support part 583, as illustrated in FIG. 17, may support the substrate "W" when a supercritical fluid process is performed on the substrate "W" at the closing location of the vessel 520.

The first substrate support part 540 may include a first support member that extends from the upper wall of the upper vessel 522 to support the substrate "W" at a location that is spaced apart from the upper wall by a first distance. The first substrate support part 540 may support the substrate "W" at a first height from the lower wall of the lower vessel 524 at the closing location of the vessel 520.

At the opening location of the vessel 520, the substrate "W" loaded into or unloaded to/from the interior of the vessel may be temporarily supported by the first substrate support part 540. An upper surface of the substrate "W" supported by the first substrate support part 540 may face the upper wall of the upper vessel 522, and a lower surface of the substrate "W" may face the lower surface of the lower vessel 524.

The substrate treating apparatus 500a may include the blocking plate 580 disposed between the lower wall of the lower vessel 524 and the first substrate support part 540. The blocking plate 580 may be installed to be spaced apart from the lower wall of the lower vessel 524 by a preset distance. The blocking plate 580 may be fixed onto the lower wall of the lower vessel 524 by the support member 582. The blocking plate 580 may include a plate of a specific thickness that occupies a specific space in the buffer area 504. The blocking plate 580 may interrupt the supercritical fluid from the first supply port 531 from being directly ejected to a rear surface of the substrate "W". A volume of the buffer area 504 may be decreased by the blocking plate 580. The volume of the buffer area 504 may be smaller than a volume of the process area 502. Accordingly, an amount of the supercritical fluid that is present in the buffer area 504 under the substrate "W" may be smaller than an amount of the supercritical fluid that is present in the process area 502 on the substrate "W". The blocking plate 580 may decrease process time by providing a structure in the buffer space under the substrate "W" to maintain process performance while decreasing an amount of the supercritical fluid used for the drying process, and thus reducing the buffer space.

The second substrate support part 583 supports the substrate "W" at a location that is spaced apart from the upper wall of the upper vessel 522 by a second distance. The second support member may support the substrate "W" at a second height that is larger than the first height, from the lower wall of the lower vessel 524 at a closing location of the vessel.

The second substrate support part 583 may be disposed on the blocking plate 580 to support the substrate "W". The second substrate support part 583 may include a plurality of second support protrusions 152 that extend upwards form an upper surface of the blocking plate 580. The second support protrusions may extend upwards from the blocking plate 580 to contact and support a central area of the substrate "W".

Although the second substrate support part 583 is disposed on the blocking plate 580, the inventive concept is not limited thereto, and the second substrate support part 583 may be installed to have a preset height from the lower wall of the lower vessel 524.

When the vessel 520 is opened, the second support protrusions that constitute the second substrate support part 583 may be moved together with the lower vessel 524. Subsequently, the substrate "W" may be loaded into the interior of the vessel 520 to be seated on the first support protrusions of the first substrate support part 540. When the vessel 520 is closed, the second support protrusions that constitute the second substrate support part 583 may be raised together with the lower vessel 524. Because the second support protrusions that constitute the second substrate support part 583 has a height that is larger than that of the first support protrusions of the first substrate support part 540, the substrate "W" may be seated on the second support protrusions that constitute the second substrate support part 583. Subsequently, a supercritical drying process may be performed on the substrate "W" supported by the second substrate support part 583.

Figure 14:
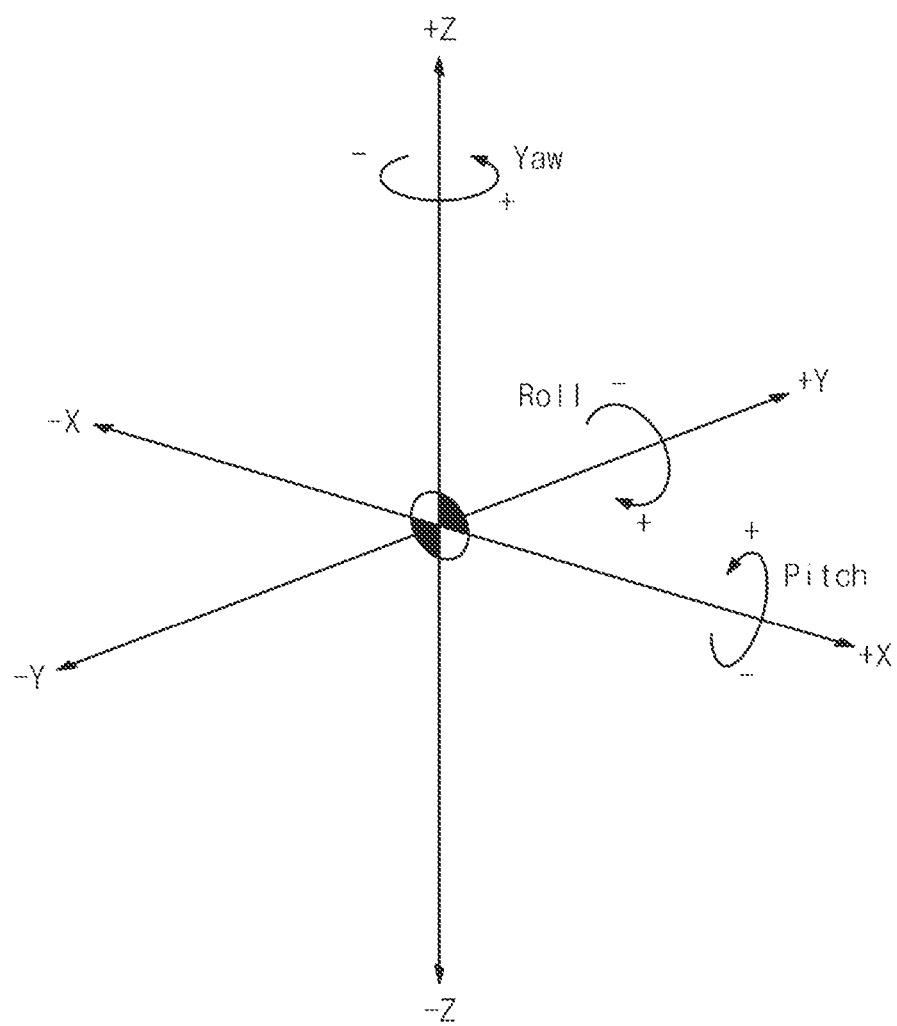
FIG. 14 is a coordinate axes for explaining a concept according to an embodiment of the inventive concept.
Figure 15:
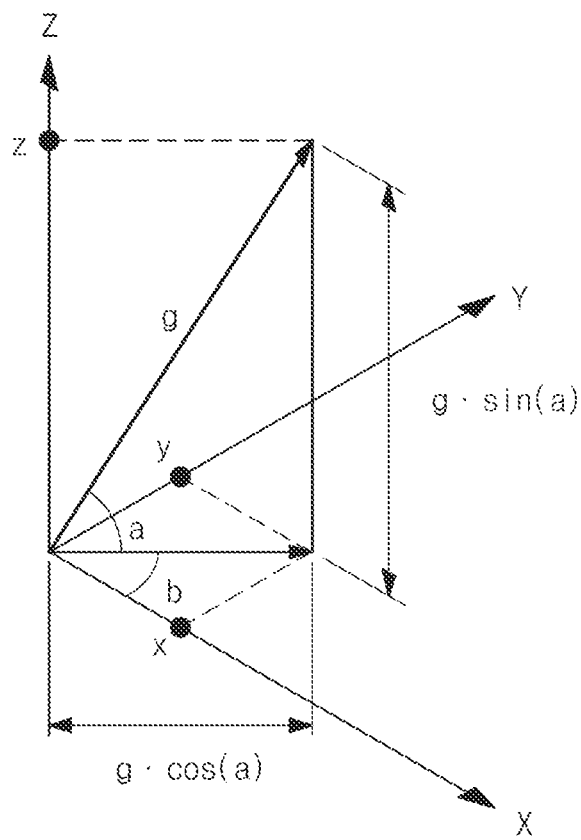
FIG. 15 is a coordinate axes for explaining a concept according to another embodiment of the inventive concept.

The substrate type sensor 600 or 1600 is provided to the supercritical treatment apparatus according to another embodiment referenced in FIGS. 14 and 15 to measure an inclination of the second substrate support part 583.

Furthermore, as an embodiment of the inventive concept, an item provided to a supercritical treatment apparatus to measure a horizontality of a support member has been described, but it may be applicable to measurement of a horizontality that requires a high precision in an environment of an atmosphere accompanied by a temperature change.

Furthermore, because the inventive concept is adapted to perform a measurement in a specific environmental condition, a higher measurement precision is achieved in a detailed situation as compared with a method, in which an acceleration sensor uses a correction coefficient to correct an item that is sensitive to temperature.

In detail, it has been described that a unique error is large in a high-temperature environment, but horizontality may be measured at a room temperature and a low temperature.

An inclination of the support member 540 measured by the above-described substrate type sensor 600 and 1600 may be calculated by a non-transitory computer readable medium that stores a program code that is executable by a processor.

According to an embodiment of the inventive concept, an idle state of a substrate support member located in an interior of a vessel that provides a high-temperature/high-pressure atmosphere and a horizontal state of the substrate support member during a process may be measured to treat a substrate (for example, a wafer) by using a supercritical fluid, and a method for measuring a horizontality by using the same.

According to an embodiment of the inventive concept, an idle state of a substrate support member located in an interior of a vessel that provides a high-temperature/high-pressure atmosphere and a horizontal state of the substrate support member during a process may be measured in unit of 0.1 degrees or less to treat a substrate (for example, a wafer) by using a supercritical fluid, and a method for measuring a horizontality by using the same.

The effects of the inventive concept are not limited to the above-mentioned effects, and the unmentioned effects can be clearly understood by those skilled in the art to which the inventive concept pertains from the specification and the accompanying drawings.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A substrate type sensor provided in an atmosphere accompanied by a temperature change to measure a horizontality of a support member that supports a substrate, the substrate type sensor comprising:
    a base having a shape of the substrate;
    one or more sensors provided in the base and including 3 or more axis acceleration sensors or 6 or more axis measurement units (IMUs);
    a receiver configured to receive data collected by the one or more sensors; and
    a power source configured to provide electric power to the one or more sensors and the receiver.

2. The substrate type sensor of claim 1, wherein the base has a physical size that is substantially the same as a size of the substrate.

3. The substrate type sensor of claim 1, wherein a plurality of sensors are provided, and a second sensor is provided at a location that is opposite to a first sensor by 180 degrees with respect to a center of the base.

4. The substrate type sensor of claim 1, further comprising:
    a transmitter configured to transmit the data received by the receiver to an outside.

5. The substrate type sensor of claim 1, wherein the support member includes a plurality of support pins that space the substrate apart from a plane of the support member by a specific interval, and
    wherein the one or more sensors are located at locations corresponding to any one or more of the support pins.

6. The substrate type sensor of claim 1, wherein the one or more sensors generate a unique error that is changed according to an exposed temperature.

\* \* \* \* \*